US011426996B2

(12) United States Patent
Kubota et al.

(10) Patent No.: US 11,426,996 B2
(45) Date of Patent: Aug. 30, 2022

(54) ULTRAFINE BUBBLE GENERATING METHOD, ULTRAFINE BUBBLE GENERATING APPARATUS, AND ULTRAFINE BUBBLE-CONTAINING LIQUID

(71) Applicant: CANON KABUSHIKI KAISHA, Tokyo (JP)

(72) Inventors: Masahiko Kubota, Tokyo (JP); Akitoshi Yamada, Yokohama (JP); Yoshiyuki Imanaka, Kawasaki (JP); Yumi Yanai, Yokohama (JP); Hiroshi Arimizu, Yotsukaido (JP); Hiroyuki Ishinaga, Tokyo (JP); Teruo Ozaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 16/802,693

(22) Filed: Feb. 27, 2020

(65) Prior Publication Data
US 2020/0276804 A1    Sep. 3, 2020

(30) Foreign Application Priority Data

Feb. 28, 2019 (JP) .............................. JP2019-035776
Feb. 6, 2020 (JP) .............................. JP2020-019019

(51) Int. Cl.
*B41J 2/045* (2006.01)
*B41J 2/14* (2006.01)
*B41J 2/16* (2006.01)

(52) U.S. Cl.
CPC .......... *B41J 2/0458* (2013.01); *B41J 2/1404* (2013.01); *B41J 2/14088* (2013.01); *B41J 2/1601* (2013.01)

(58) Field of Classification Search
CPC .... B41J 2/17563; B41J 2/0458; B41J 2/1404; B41J 2/21; B41J 2/01; B41J 2/14088;
(Continued)

(56) References Cited

U.S. PATENT DOCUMENTS 3,227,547 A    1/1966 Szekely
3,743,263 A    7/1973 Szekely
(Continued)

FOREIGN PATENT DOCUMENTS

CN    1351514 A    5/2002
CN    1840231 A    10/2006
(Continued)

OTHER PUBLICATIONS

Extended European Search Report in European Application No. 20159723.4 (dated Jul. 2020).
(Continued)

*Primary Examiner* — Thinh H Nguyen
(74) *Attorney, Agent, or Firm* — Venable LLP

(57) ABSTRACT

Provided is an UFB generating apparatus and an UFB generating method capable of efficiently generating an UFB-containing liquid with high purity. The ultrafine bubble generating apparatus includes a generating unit that generates ultrafine bubbles in a liquid and a post-processing unit that performs predetermined post-processing on the ultrafine bubble-containing liquid generated by the generating unit. The generating unit generates the ultrafine bubbles by causing a heating element, which is provided in the liquid on which the pre-processing is performed, to generate heat to generate film boiling on an interface between the liquid and the heating element.

44 Claims, 13 Drawing Sheets

(58) Field of Classification Search
CPC .... B41J 2/1601; B41J 2/1707; B41J 2/17596; B41J 2/19
See application file for complete search history.

(56) References Cited

U.S. PATENT DOCUMENTS

| | | | |
|---|---|---|---|
| 3,870,511 | A | 3/1975 | Szekely |
| 3,980,742 | A | 9/1976 | Szekely |
| 4,021,026 | A | 5/1977 | Szekely |
| 4,047,938 | A | 9/1977 | Szekely |
| 6,443,561 | B1 | 9/2002 | Murakami |
| 6,464,342 | B1 | 10/2002 | Kubota et al. |
| 8,356,885 | B2 | 1/2013 | Silverbrook et al. |
| 8,740,450 | B2 | 6/2014 | Mogami et al. |
| 9,327,251 | B2 | 5/2016 | Li |
| 2015/0232353 | A1 | 8/2015 | Denvir et al. |
| 2015/0343399 | A1* | 12/2015 | Kim .................. C10L 1/328 435/408 |
| 2016/0368785 | A1 | 12/2016 | Zamir |
| 2017/0029716 | A1 | 2/2017 | Dasgupta |
| 2017/0251725 | A1 | 9/2017 | Buchberger et al. |
| 2017/0340991 | A1 | 11/2017 | Kobayashi et al. |

FOREIGN PATENT DOCUMENTS

| | | |
|---|---|---|
| CN | 106186474 A | 12/2016 |
| CN | 106999933 A | 8/2017 |
| CN | 109052712 A | 12/2018 |
| EA | 031074 B1 | 11/2018 |
| EP | 1 078 757 A2 | 2/2001 |
| EP | 1 188 473 A1 | 3/2002 |
| JP | 2003-334548 A | 11/2003 |
| JP | 4456176 B2 | 4/2010 |
| JP | 6118544 B2 | 4/2017 |
| RU | 2665204 C2 | 8/2018 |
| SU | 1068040 A3 | 1/1984 |
| WO | 2016/079269 A1 | 5/2016 |
| WO | 2018/148247 A1 | 8/2018 |
| WO | 2019/044631 A1 | 3/2019 |
| WO | 2019/044913 A1 | 3/2019 |

OTHER PUBLICATIONS

Kubota et al., U.S. Appl. No. 16/642,432, filed Feb. 27, 2020.
Takahashi et al., U.S. Appl. No. 16/642,426, field Feb. 27, 2020.
Kubota et al., U.S. Appl. No. 16/802,685, filed Feb. 27, 2020.
Ozaki et al., U.S. Appl. No. 16/802,672, filed Feb. 27, 2020.
Arimizu et al., U.S. Appl. No. 16/802,675, filed Feb. 27, 2020.
Imanaka et al., U.S. Appl. No. 16/802,688, filed Feb. 27, 2020.
Ishinaga et al., U.S. Appl. No. 16/802,680, filed Feb. 27, 2020.
Yanai, et al., U.S. Appl. No. 16/802,677, filed Feb. 27, 2020.
Ozaki, et al., U.S. Appl. No. 16/802,667, filed Feb. 27, 2020.
Imanaka et al., U.S. Appl. No. 16/802,661, filed Feb. 27, 2020.
Imanaka et al., U.S. Appl. No. 16/802,652, filed Feb. 27, 2020.
Office Action in Russian Application No. 2020108474 (dated Nov. 2020).
Written Opinion in Singapore Application No. 10202001781X (dated Sep. 2020).
First Office Action in Chinese Application No. 202010122219.4 (dated Apr. 2022).
Communication Pursuant to Article 94(3) EPC in European Application No. 20159723.4 (dated Jun. 2022).

* cited by examiner

ULTRAFINE BUBBLE GENERATING METHOD, ULTRAFINE BUBBLE GENERATING APPARATUS, AND ULTRAFINE BUBBLE-CONTAINING LIQUID

BACKGROUND OF THE INVENTION

Field of the Invention

The present invention relates to an ultrafine bubble generating method and an ultrafine bubble generating apparatus for generating ultrafine bubbles smaller than 1.0 µm in diameter, and an ultrafine bubble-containing liquid.

Description of the Related Art

Recently, there have been developed techniques for applying the features of fine bubbles such as microbubbles in micrometer-size in diameter and nanobubbles in nanometer-size in diameter. Especially, the utility of ultrafine bubbles (hereinafter also referred to as "UFBs") smaller than 1.0 µm in diameter have been confirmed in various fields.

Japanese Patent No. 6118544 discloses a fine air bubble generating apparatus that generates fine bubbles by ejecting from a depressurizing nozzle a pressurized liquid in which a gas is pressurized and dissolved. Japanese Patent No. 4456176 discloses an apparatus that generates fine bubbles by repeating separating and converging of flows of a gas-mixed liquid with a mixing unit.

Both the apparatuses described in Japanese Patent Nos. 6118544 and 4456176 generate not only the UFBs of nanometer-size in diameter but also relatively a large number of milli-bubbles of millimeter-size in diameter and microbubbles of micrometer-size in diameter. However, because the milli-bubbles and the microbubbles are affected by the buoyancy, the bubbles are likely to gradually rise to the liquid surface and disappear during long-time storage.

On the other hand, the UFBs of nanometer-size in diameter are suitable for long-time storage since they are less likely to be affected by the buoyancy and float in the liquid with Brownian motion. However, when the UFBs are generated with the milli-bubbles and the microbubbles or the gas-liquid interface energy of the UFBs is small, the UFBs are affected by the disappearance of the milli-bubbles and the microbubbles and decreased over time.

SUMMARY OF THE INVENTION

That is, in order to obtain a UFB-containing liquid in which the concentration reduction of the UFBs can be suppressed even during long-time storage, it is required to generate highly pure and highly concentrated UFBs with large gas-liquid interface energy when generating a UFB-containing liquid.

The present invention is made to solve the above-described problems. Therefore, an object of the present invention is to provide an ultrafine bubble generating apparatus and an ultrafine bubble generating method capable of efficiently generating a UFB-containing liquid with high purity.

In a first aspect of the present invention, there is provided an ultrafine bubble generating method comprising: a generating step of generating ultrafine bubbles by causing a heating element provided in a liquid to generate heat to generate film boiling on an interface between the liquid and the heating element; and a post-processing step of performing predetermined post-processing on an ultrafine bubble-containing liquid containing the ultrafine bubbles generated in the generating step.

In a second aspect of the present invention, there is provided an ultrafine bubble generating apparatus comprising: a generating unit that generates ultrafine bubbles by causing a heating element provided in a liquid to generate heat to generate film boiling on an interface between the liquid and the heating element; and a post-processing unit that performs predetermined post-processing on an ultrafine bubble-containing liquid containing the ultrafine bubbles generated by the generating unit.

In a third aspect of the present invention, there is provided an ultrafine bubble-containing liquid that contains ultrafine bubbles generated by an ultrafine bubble generating method including: a generating step of generating ultrafine bubbles by causing a heating element provided in a liquid to generate heat to generate film boiling on an interface between the liquid and the heating element; and a post-processing step of performing predetermined post-processing on an ultrafine bubble-containing liquid containing the ultrafine bubbles generated in the generating step.

Further features of the present invention will become apparent from the following description of exemplary embodiments with reference to the attached drawings.

DESCRIPTION OF THE EMBODIMENTS

<<Configuration of UFB Generating Apparatus>>

Figure 1:
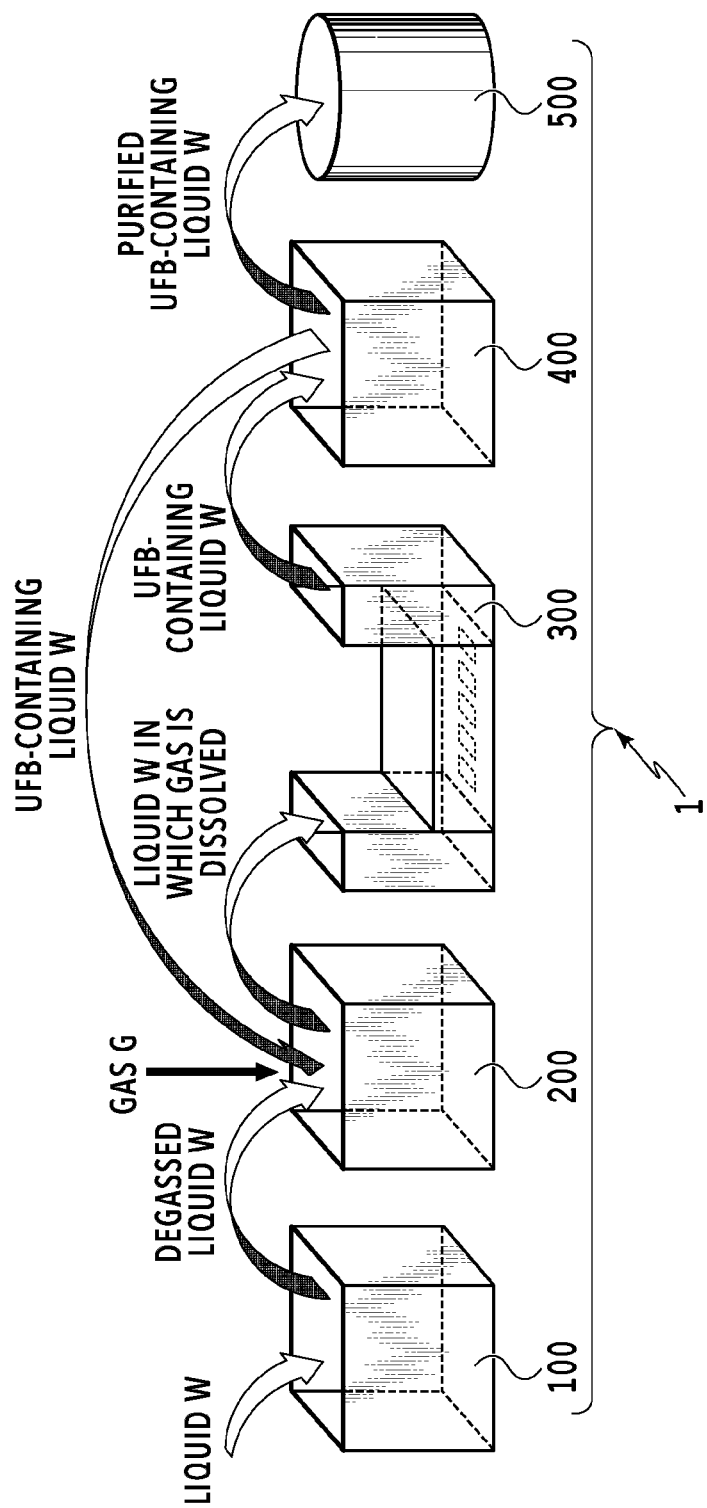
FIG. 1 is a diagram illustrating an example of a UFB generating apparatus.

FIG. 1 is a diagram illustrating an example of a UFB generating apparatus applicable to the present invention. A UFB generating apparatus 1 of this embodiment includes a pre-processing unit 100, dissolving unit 200, a T-UFB generating unit 300, a post-processing unit 400, and a collecting unit 500. Each unit performs unique processing on a liquid W such as tap water supplied to the pre-processing unit 100 in the above order, and the thus-processed liquid W is collected as a T-UFB-containing liquid by the collecting unit 500. Functions and configurations of the units are described below. Although details are described later, UFBs generated by utilizing the film boiling caused by rapid heating are referred to as thermal-ultrafine bubbles (T-UFBs) in this specification.

Figure 2:
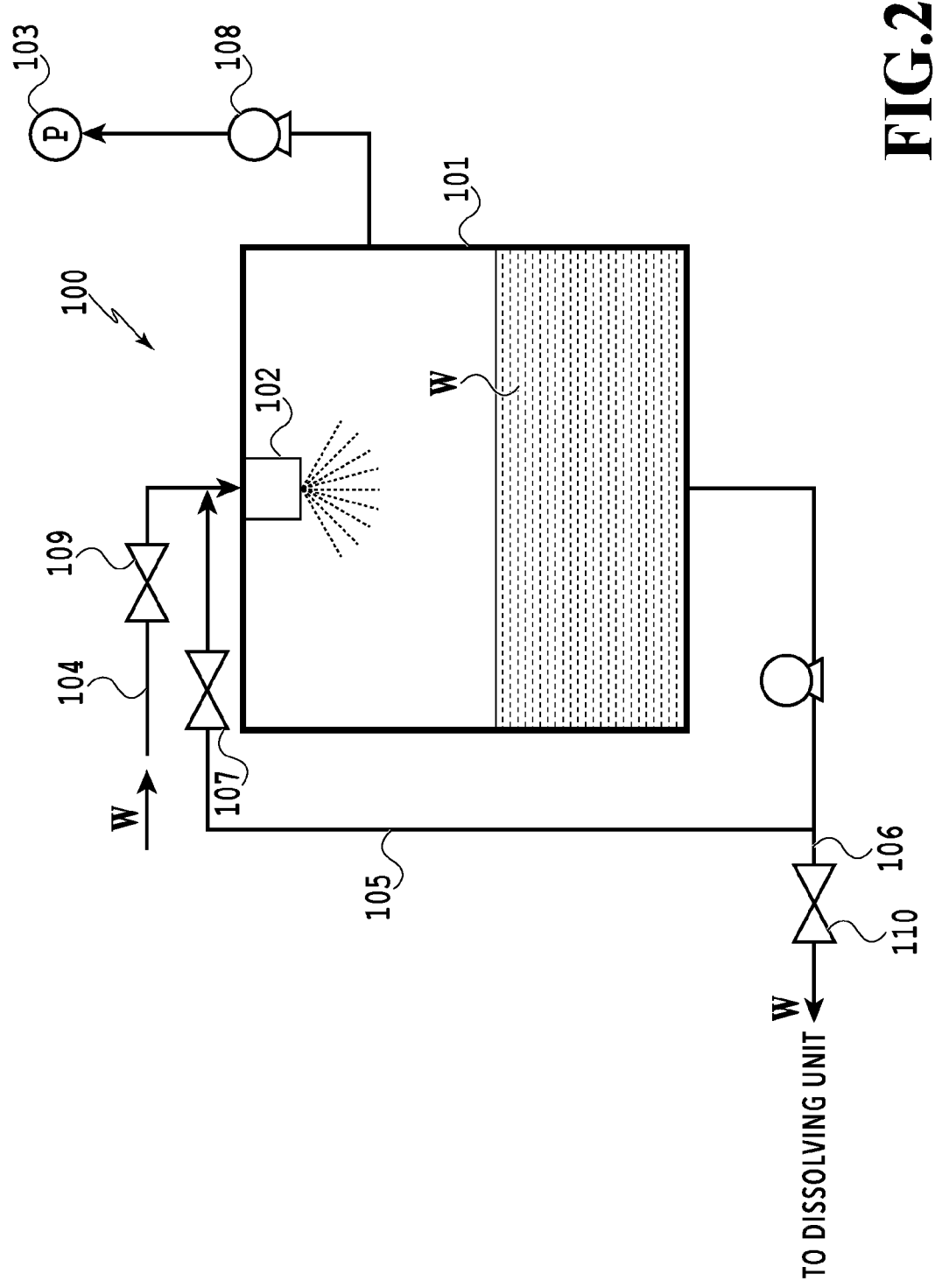
FIG. 2 is a schematic configuration diagram of a pre-processing unit.

FIG. 2 is a schematic configuration diagram of the pre-processing unit 100. The pre-processing unit 100 of this embodiment performs a degassing treatment on the supplied liquid W. The pre-processing unit 100 mainly includes a degassing container 101, a shower head 102, a depressurizing pump 103, a liquid introduction passage 104, a liquid circulation passage 105, and a liquid discharge passage 106. For example, the liquid W such as tap water is supplied to the degassing container 101 from the liquid introduction passage 104 through a valve 109. In this process, the shower head 102 provided in the degassing container 101 sprays a mist of the liquid Win the degassing container 101. The shower head 102 is for prompting the gasification of the liquid W; however, a centrifugal and the like may be used instead as the mechanism for producing the gasification prompt effect.

When a certain amount of the liquid W is reserved in the degassing container 101 and then the depressurizing pump 103 is activated with all the valves closed, already-gasified gas components are discharged, and gasification and discharge of gas components dissolved in the liquid W are also prompted. In this process, the internal pressure of the degassing container 101 may be depressurized to around several hundreds to thousands of Pa (1.0 Torr to 10.0 Torr) while checking a manometer 108. The gases to be removed by the pre-processing unit 100 includes nitrogen, oxygen, argon, carbon dioxide, and so on, for example.

The above-described degassing processing can be repeatedly performed on the same liquid W by utilizing the liquid circulation passage 105. Specifically, the shower head 102 is operated with the valve 109 of the liquid introduction passage 104 and a valve 110 of the liquid discharge passage 106 closed and a valve 107 of the liquid circulation passage 105 opened. This allows the liquid W reserved in the degassing container 101 and degassed once to be resprayed in the degassing container 101 from the shower head 102. In addition, with the depressurizing pump 103 operated, the gasification processing by the shower head 102 and the degassing processing by the depressurizing pump 103 are repeatedly performed on the same liquid W. Every time the above processing utilizing the liquid circulation passage 105 is performed repeatedly, it is possible to decrease the gas components contained in the liquid W in stages. Once the liquid W degassed to a desired purity is obtained, the liquid W is transferred to the dissolving unit 200 through the liquid discharge passage 106 with the valve 110 opened.

FIG. 2 illustrates the degassing unit 100 that depressurizes the gas part to gasify the solute; however, the method of degassing the solution is not limited thereto. For example, a heating and boiling method for boiling the liquid W to gasify the solute may be employed, or a film degassing method for increasing the interface between the liquid and the gas using hollow fibers. A SEPAREL series (produced by DIC corporation) is commercially supplied as the degassing module using the hollow fibers. The SEPAREL series uses poly (4-methylpentene-1) (PMP) for the raw material of the hollow fibers and is used for removing air bubbles from ink and the like mainly supplied for a piezo head. In addition, two or more of an evacuating method, the heating and boiling method, and the film degassing method may be used together.

Figure 3A:
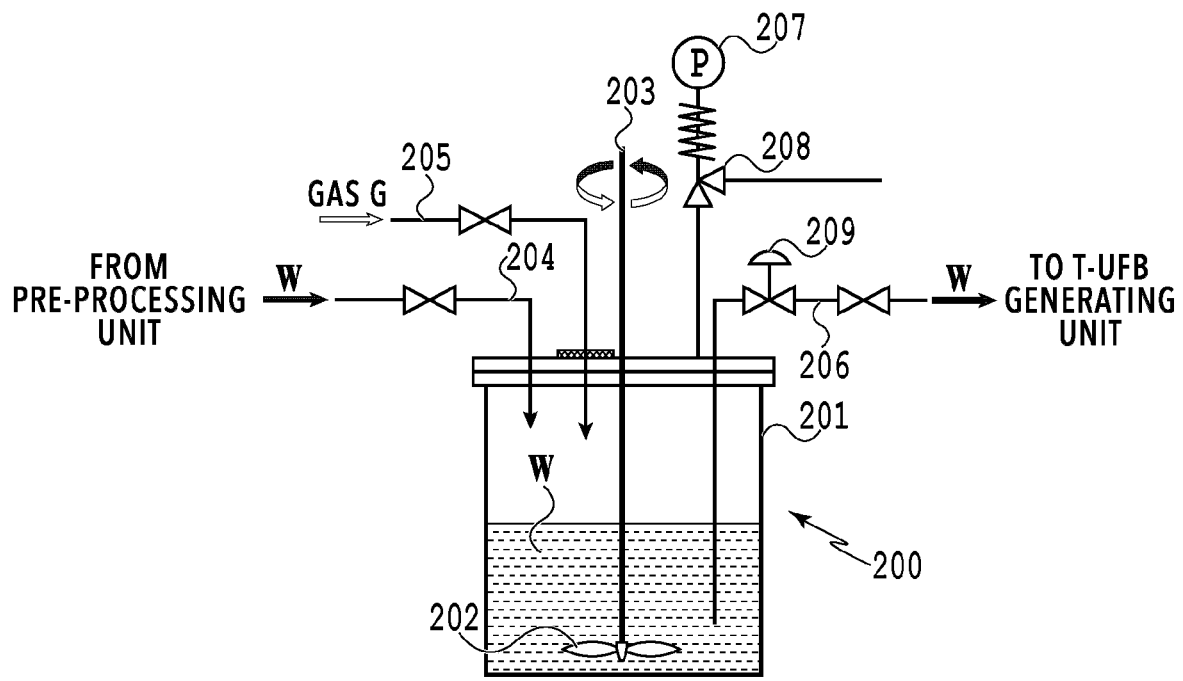
FIGS. 3A and 3B are a schematic configuration diagram of a dissolving unit and a diagram for describing the dissolving states in a liquid.
Figure 3B:
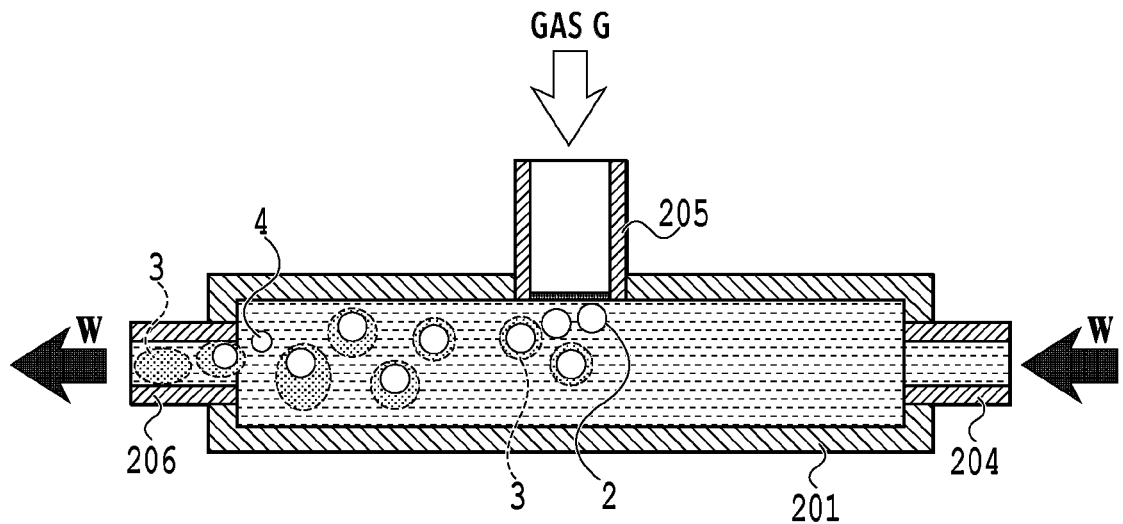

FIGS. 3A and 3B are a schematic configuration diagram of the dissolving unit 200 and a diagram for describing the dissolving states in the liquid. The dissolving unit 200 is a unit for dissolving a desired gas into the liquid W supplied from the pre-processing unit 100. The dissolving unit 200 of this embodiment mainly includes a dissolving container 201, a rotation shaft 203 provided with a rotation plate 202, a liquid introduction passage 204, a gas introduction passage 205, a liquid discharge passage 206, and a pressurizing pump 207.

The liquid W supplied from the pre-processing unit 100 is supplied and reserved into the dissolving container 201 through the liquid introduction passage 204. Meanwhile, a gas G is supplied to the dissolving container 201 through the gas introduction passage 205.

Once predetermined amounts of the liquid W and the gas G are reserved in the dissolving container 201, the pressurizing pump 207 is activated to increase the internal pressure of the dissolving container 201 to about 0.5 MPa. A safety valve 208 is arranged between the pressurizing pump 207 and the dissolving container 201. With the rotation plate 202 in the liquid rotated via the rotation shaft 203, the gas G supplied to the dissolving container 201 is transformed into air bubbles, and the contact area between the gas G and the liquid W is increased to prompt the dissolution into the liquid W. This operation is continued until the solubility of the gas G reaches almost the maximum saturation solubility. In this case, a unit for decreasing the temperature of the liquid may be provided to dissolve the gas as much as possible. When the gas is with low solubility, it is also possible to increase the internal pressure of the dissolving container 201 to 0.5 MPa or higher. In this case, the material and the like of the container need to be the optimum for safety sake.

Once the liquid Win which the components of the gas G are dissolved at a desired concentration is obtained, the liquid W is discharged through the liquid discharge passage 206 and supplied to the T-UFB generating unit 300. In this process, a back-pressure valve 209 adjusts the flow pressure of the liquid W to prevent excessive increase of the pressure during the supplying.

FIG. 3B is a diagram schematically illustrating the dissolving states of the gas G put in the dissolving container 201. An air bubble 2 containing the components of the gas G put in the liquid W is dissolved from a portion in contact with the liquid W. The air bubble 2 thus shrinks gradually, and a gas-dissolved liquid 3 then appears around the air bubble 2. Since the air bubble 2 is affected by the buoyancy, the air bubble 2 may be moved to a position away from the center of the gas-dissolved liquid 3 or be separated out from the gas-dissolved liquid 3 to become a residual air bubble 4. Specifically, in the liquid W to be supplied to the T-UFB generating unit 300 through the liquid discharge passage 206, there is a mix of the air bubbles 2 surrounded by the gas-dissolved liquids 3 and the air bubbles 2 and the gas-dissolved liquids 3 separated from each other.

The gas-dissolved liquid 3 in the drawings means "a region of the liquid W in which the dissolution concentration of the gas G mixed therein is relatively high." In the gas components actually dissolved in the liquid W, the concentration of the gas components in the gas-dissolved liquid 3 is the highest at a portion surrounding the air bubble 2. In a case where the gas-dissolved liquid 3 is separated from the air bubble 2 the concentration of the gas components of the gas-dissolved liquid 3 is the highest at the center of the region, and the concentration is continuously decreased as away from the center. That is, although the region of the gas-dissolved liquid 3 is surrounded by a broken line in FIG. 3 for the sake of explanation, such a clear boundary does not actually exist. In addition, in the present invention, a gas that cannot be dissolved completely may be accepted to exist in the form of an air bubble in the liquid.

Figure 4:
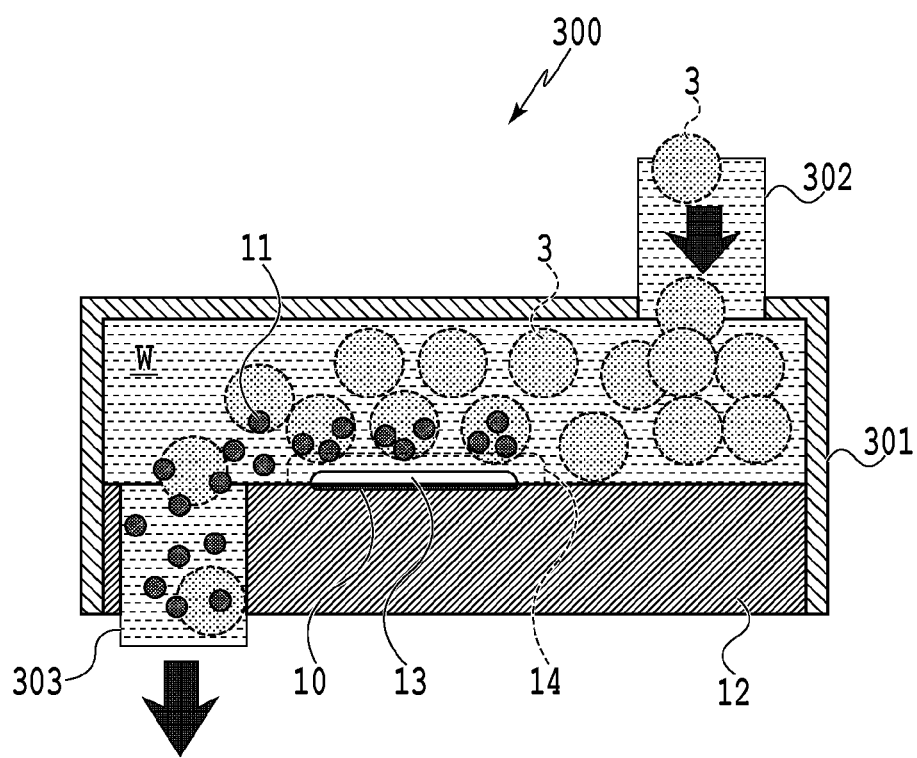
FIG. 4 is a schematic configuration diagram of a T-UFB generating unit.

FIG. 4 is a schematic configuration diagram of the T-UFB generating unit 300. The T-UFB generating unit 300 mainly includes a chamber 301, a liquid introduction passage 302, and a liquid discharge passage 303. The flow from the liquid introduction passage 302 to the liquid discharge passage 303 through the chamber 301 is formed by a not-illustrated flow pump. Various pumps including a diaphragm pump, a gear pump, and a screw pump may be employed as the flow pump. In the liquid W introduced from the liquid introduction passage 302, the gas-dissolved liquid 3 of the gas G put by the dissolving unit 200 is mixed.

An element substrate 12 provided with a heating element 10 is arranged on a bottom section of the chamber 301. With a predetermined voltage pulse applied to the heating element 10, a bubble 13 generated by the film boiling (hereinafter, also referred to as a film boiling bubble 13) is generated in a region in contact with the heating element 10. Then, an ultrafine bubble (UFB) 11 containing the gas G is generated caused by expansion and shrinkage of the film boiling bubble 13. As a result, a UFB-containing liquid W containing many UFBs 11 is discharged from the liquid discharge passage 303.

Figure 5A:
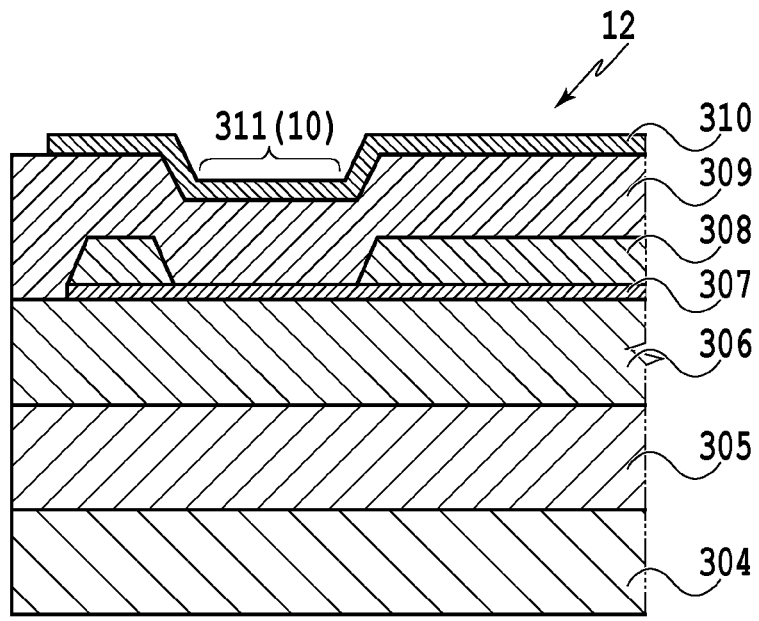
FIGS. 5A and 5B are diagrams for describing details of a heating element.
Figure 5B:
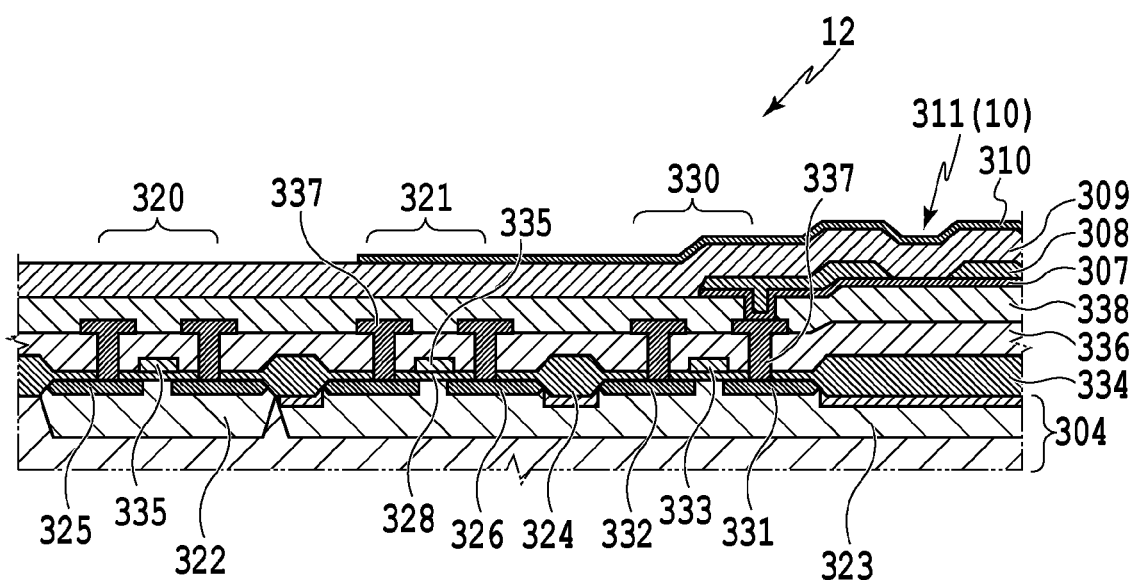

FIGS. 5A and 5B are diagrams for illustrating a detailed configuration of the heating element 10. FIG. 5A illustrates a closeup view of the heating element 10, and FIG. 5B illustrates a cross-sectional view of a wider region of the element substrate 12 including the heating element 10.

As illustrated in FIG. 5A, in the element substrate 12 of this embodiment, a thermal oxide film 305 as a heat-accumulating layer and an interlaminar film 306 also served as a heat-accumulating layer are laminated on a surface of a silicon substrate 304. An $SiO_2$ film or an SiN film may be used as the interlaminar film 306. A resistive layer 307 is formed on a surface of the interlaminar film 306, and a wiring 308 is partially formed on a surface of the resistive layer 307. An Al-alloy wiring of Al, Al—Si, Al—Cu, or the like may be used as the wiring 308. A protective layer 309 made of an $SiO_2$ film or an $Si_3N_4$ film is formed on surfaces of the wiring 308, the resistive layer 307, and the interlaminar film 306.

A cavitation-resistant film 310 for protecting the protective layer 309 from chemical and physical impacts due to the heat evolved by the resistive layer 307 is formed on a portion and around the portion on the surface of the protective layer 309, the portion corresponding to a heat-acting portion 311 that eventually becomes the heating element 10. A region on the surface of the resistive layer 307 in which the wiring 308 is not formed is the heat-acting portion 311 in which the resistive layer 307 evolves heat. The heating portion of the resistive layer 307 on which the wiring 308 is not formed functions as the heating element (heater) 10. As described above, the layers in the element substrate 12 are sequentially formed on the surface of the silicon substrate 304 by a semiconductor production technique, and the heat-acting portion 311 is thus provided on the silicon substrate 304.

The configuration illustrated in the drawings is an example, and various other configurations are applicable. For example, a configuration in which the laminating order of the resistive layer 307 and the wiring 308 is opposite, and a configuration in which an electrode is connected to a lower surface of the resistive layer 307 (so-called a plug electrode configuration) are applicable. In other words, as described later, any configuration may be applied as long as the configuration allows the heat-acting portion 311 to heat the liquid for generating the film boiling in the liquid.

FIG. 5B is an example of a cross-sectional view of a region including a circuit connected to the wiring 308 in the element substrate 12. An N-type well region 322 and a P-type well region 323 are partially provided in a top layer of the silicon substrate 304, which is a P-type conductor. AP-MOS 320 is formed in the N-type well region 322 and an N-MOS 321 is formed in the P-type well region 323 by introduction and diffusion of impurities by the ion implantation and the like in the general MOS process.

The P-MOS 320 includes a source region 325 and a drain region 326 formed by partial introduction of N-type or P-type impurities in a top layer of the N-type well region 322, a gate wiring 335, and so on. The gate wiring 335 is deposited on a part of a top surface of the N-type well region 322 excluding the source region 325 and the drain region 326, with a gate insulation film 328 of several hundreds of Å in thickness interposed between the gate wiring 335 and the top surface of the N-type well region 322.

The N-MOS 321 includes the source region 325 and the drain region 326 formed by partial introduction of N-type or P-type impurities in a top layer of the P-type well region 323, the gate wiring 335, and so on. The gate wiring 335 is deposited on a part of a top surface of the P-type well region 323 excluding the source region 325 and the drain region 326, with the gate insulation film 328 of several hundreds of Å in thickness interposed between the gate wiring 335 and the top surface of the P-type well region 323. The gate wiring 335 is made of polysilicon of 3000 Å to 5000 Å in thickness deposited by the CVD method. A C-MOS logic is constructed with the P-MOS 320 and the N-MOS 321.

In the P-type well region 323, an N-MOS transistor 330 for driving an electrothermal conversion element (heating resistance element) is formed on a portion different from the portion including the N-MOS 321. The N-MOS transistor 330 includes a source region 332 and a drain region 331 partially provided in the top layer of the P-type well region 323 by the steps of introduction and diffusion of impurities, a gate wiring 333, and so on. The gate wiring 333 is deposited on a part of the top surface of the P-type well region 323 excluding the source region 332 and the drain region 331, with the gate insulation film 328 interposed between the gate wiring 333 and the top surface of the P-type well region 323.

In this example, the N-MOS transistor 330 is used as the transistor for driving the electrothermal conversion element. However, the transistor for driving is not limited to the N-MOS transistor 330, and any transistor may be used as long as the transistor has a capability of driving multiple electrothermal conversion elements individually and can implement the above-described fine configuration. Although the electrothermal conversion element and the transistor for driving the electrothermal conversion element are formed on the same substrate in this example, those may be formed on different substrates separately.

An oxide film separation region 324 is formed by field oxidation of 5000 Å to 10000 Å in thickness between the elements, such as between the P-MOS 320 and the N-MOS 321 and between the N-MOS 321 and the N-MOS transistor 330. The oxide film separation region 324 separates the elements. A portion of the oxide film separation region 324 corresponding to the heat-acting portion 311 functions as a heat-accumulating layer 334, which is the first layer on the silicon substrate 304.

An interlayer insulation film 336 including a PSG film, a BPSG film, or the like of about 7000 Å in thickness is formed by the CVD method on each surface of the elements such as the P-MOS 320, the N-MOS 321, and the N-MOS transistor 330. After the interlayer insulation film 336 is made flat by heat treatment, an Al electrode 337 as a first wiring layer is formed in a contact hole penetrating through the interlayer insulation film 336 and the gate insulation film 328. On surfaces of the interlayer insulation film 336 and the Al electrode 337, an interlayer insulation film 338 including an $SiO_2$ film of 10000 Å to 15000 Å in thickness is formed by a plasma CVD method. On the surface of the interlayer insulation film 338, a resistive layer 307 including a TaSiN film of about 500 Å in thickness is formed by a co-sputter method on portions corresponding to the heat-acting portion 311 and the N-MOS transistor 330. The resistive layer 307 is electrically connected with the Al electrode 337 near the drain region 331 via a through-hole formed in the interlayer insulation film 338. On the surface of the resistive layer 307, the wiring 308 of Al as a second wiring layer for a wiring to each electrothermal conversion element is formed. The protective layer 309 on the surfaces of the wiring 308, the resistive layer 307, and the interlayer insulation film 338 includes an SiN film of 3000 Å in thickness formed by the plasma CVD method. The cavitation-resistant film 310 deposited on the surface of the protective layer 309 includes a thin film of about 2000 Å in thickness, which is at least one metal selected from the group consisting of Ta, Fe, Ni, Cr, Ge, Ru, Zr, Ir, and the like. Various materials other than the above-described TaSiN such as TaN0.8, CrSiN, TaAl, WSiN, and the like can be applied as long as the material can generate the film boiling in the liquid.

Figure 6A:
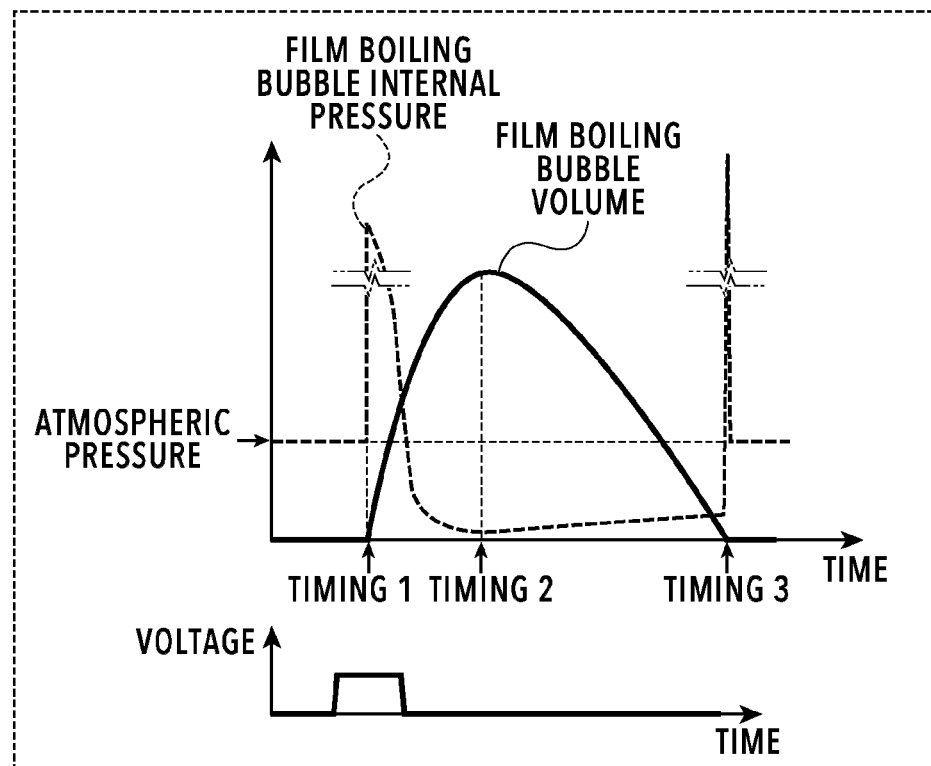
FIGS. 6A and 6B are diagrams for describing the states of film boiling on the heating element.
Figure 6B:
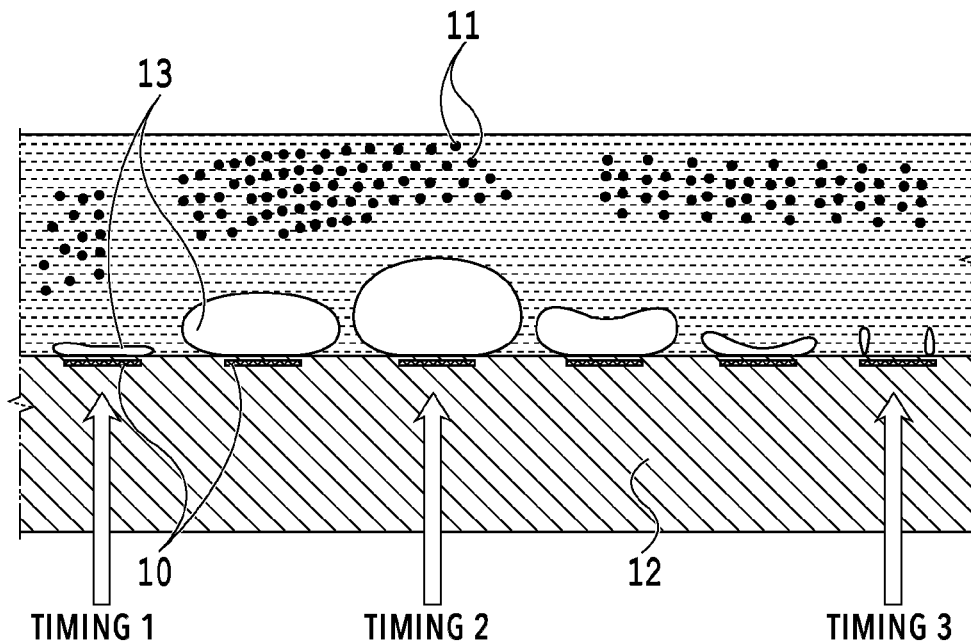

FIGS. 6A and 6B are diagrams illustrating the states of the film boiling when a predetermined voltage pulse is applied to the heating element 10. In this case, the case of generating the film boiling under atmospheric pressure is described. In FIG. 6A, the horizontal axis represents time. The vertical axis in the lower graph represents a voltage applied to the heating element 10, and the vertical axis in the upper graph represents the volume and the internal pressure of the film boiling bubble 13 generated by the film boiling. On the other hand, FIG. 6B illustrates the states of the film boiling bubble 13 in association with timings 1 to 3 shown in FIG. 6A. Each of the states is described below in chronological order. The UFBs 11 generated by the film boiling as described later are mainly generated near a surface of the film boiling bubble 13. The states illustrated in FIG. 6B are the states where the UFBs 11 generated by the generating unit 300 are resupplied to the dissolving unit 200 through the circulation route, and the liquid containing the UFBs 11 is resupplied to the liquid passage of the generating unit 300, as illustrated in FIG. 1.

Before a voltage is applied to the heating element 10, the atmospheric pressure is substantially maintained in the chamber 301. Once a voltage is applied to the heating element 10, the film boiling is generated in the liquid in contact with the heating element 10, and a thus-generated air bubble (hereinafter, referred to as the film boiling bubble 13) is expanded by a high pressure acting from inside (timing 1). A bubbling pressure in this process is expected to be around 8 to 10 MPa, which is a value close to a saturation vapor pressure of water.

The time for applying a voltage (pulse width) is around 0.5 μsec to 10.0 μsec, and the film boiling bubble 13 is expanded by the inertia of the pressure obtained in timing 1 even after the voltage application. However, a negative pressure generated with the expansion is gradually increased inside the film boiling bubble 13, and the negative pressure acts in a direction to shrink the film boiling bubble 13. After a while, the volume of the film boiling bubble 13 becomes the maximum in timing 2 when the inertial force and the negative pressure are balanced, and thereafter the film boiling bubble 13 shrinks rapidly by the negative pressure.

In the disappearance of the film boiling bubble 13, the film boiling bubble 13 disappears not in the entire surface of the heating element 10 but in one or more extremely small regions. For this reason, on the heating element 10, further greater force than that in the bubbling in timing 1 is generated in the extremely small region in which the film boiling bubble 13 disappears (timing 3).

The generation, expansion, shrinkage, and disappearance of the film boiling bubble 13 as described above are repeated every time a voltage pulse is applied to the heating element 10, and new UFBs 11 are generated each time.

The states of generation of the UFBs 11 in each process of the generation, expansion, shrinkage, and disappearance of the film boiling bubble 13 are further described in detail with reference to FIGS. 7A to 10B.

Figure 7A:
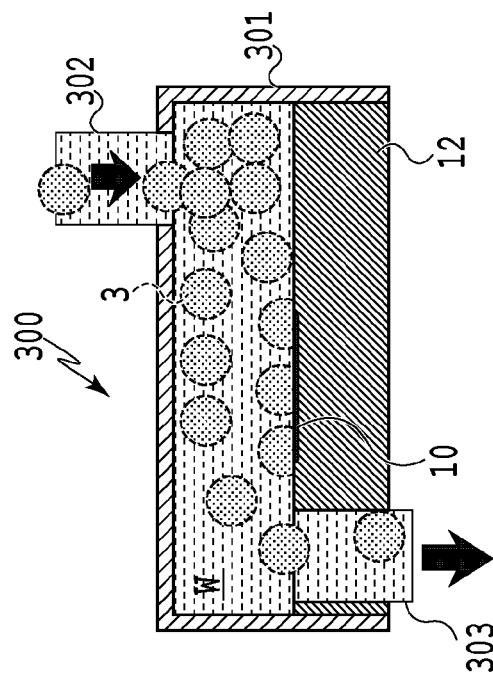
FIGS. 7A to 7D are diagrams illustrating the states of generation of UFBs caused by expansion of a film boiling bubble.

FIGS. 7A to 7D are diagrams schematically illustrating the states of generation of the UFBs 11 caused by the generation and the expansion of the film boiling bubble 13. FIG. 7A illustrates the state before the application of a voltage pulse to the heating element 10. The liquid W in which the gas-dissolved liquids 3 are mixed flows inside the chamber 301.

Figure 7B:
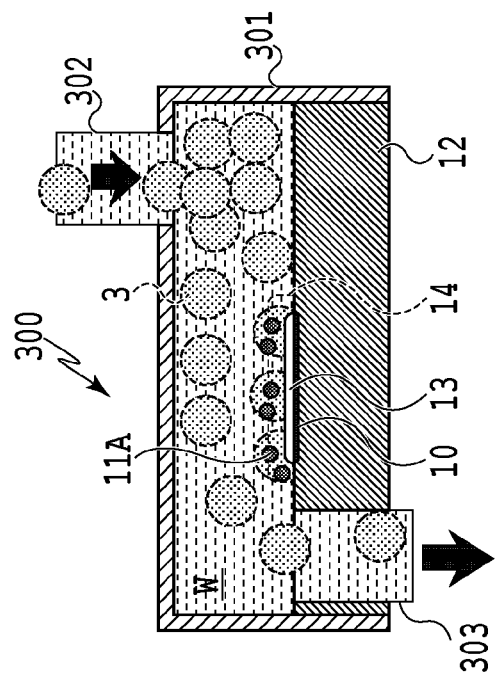

FIG. 7B illustrates the state where a voltage is applied to the heating element 10, and the film boiling bubble 13 is evenly generated in almost all over the region of the heating element 10 in contact with the liquid W. When a voltage is applied, the surface temperature of the heating element 10 rapidly increases at a speed of 10° C./μsec. The film boiling occurs at a time point when the temperature reaches almost 300° C., and the film boiling bubble 13 is thus generated.

Thereafter, the surface temperature of the heating element 10 keeps increasing to around 600 to 800° C. during the pulse application, and the liquid around the film boiling bubble 13 is rapidly heated as well. In FIG. 7B, a region of the liquid that is around the film boiling bubble 13 and to be rapidly heated is indicated as a not-yet-bubbling high temperature region 14. The gas-dissolved liquid 3 within the not-yet-bubbling high temperature region 14 exceeds the thermal dissolution limit and is vaporized to become the UFB. The thus-vaporized air bubbles have diameters of around 10 nm to 100 nm and large gas-liquid interface energy. Thus, the air bubbles float independently in the liquid W without disappearing in a short time. In this embodiment, the air bubbles generated by the thermal action from the generation to the expansion of the film boiling bubble 13 are called first UFBs 11A.

Figure 7C:
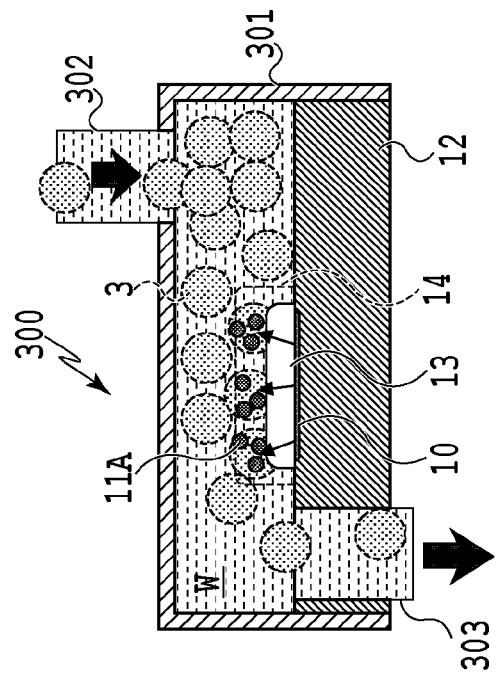

FIG. 7C illustrates the state where the film boiling bubble 13 is expanded. Even after the voltage pulse application to the heating element 10, the film boiling bubble 13 continues expansion by the inertia of the force obtained from the generation thereof, and the not-yet-bubbling high temperature region 14 is also moved and spread by the inertia. Specifically, in the process of the expansion of the film boiling bubble 13, the gas-dissolved liquid 3 within the not-yet-bubbling high temperature region 14 is vaporized as a new air bubble and becomes the first UFB 11A.

Figure 7D:
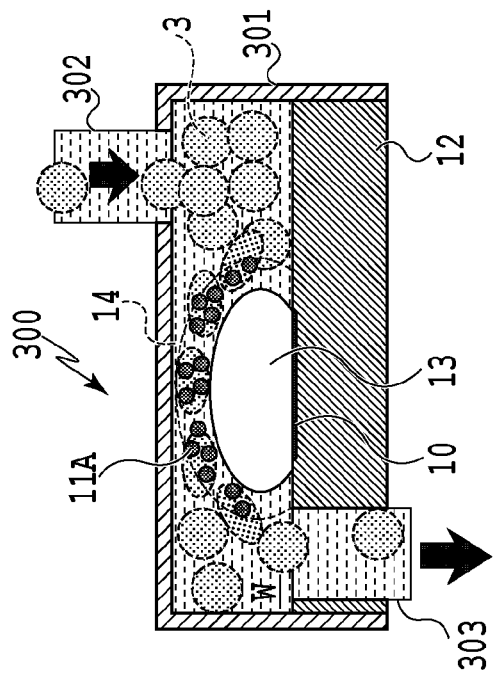

FIG. 7D illustrates the state where the film boiling bubble 13 has the maximum volume. As the film boiling bubble 13 is expanded by the inertia, the negative pressure inside the film boiling bubble 13 is gradually increased along with the expansion, and the negative pressure acts to shrink the film boiling bubble 13. At a time point when the negative pressure and the inertial force are balanced, the volume of the film boiling bubble 13 becomes the maximum, and then the shrinkage is started.

Figure 8A:
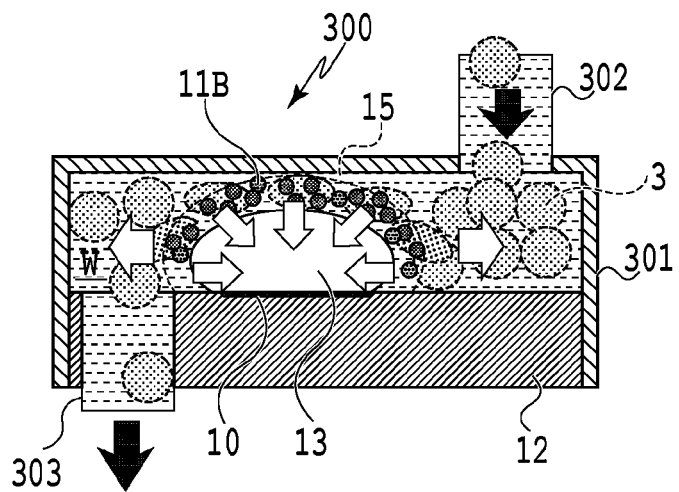
FIGS. 8A to 8C are diagrams illustrating the states of generation of UFBs caused by shrinkage of the film boiling bubble.
Figure 8B:
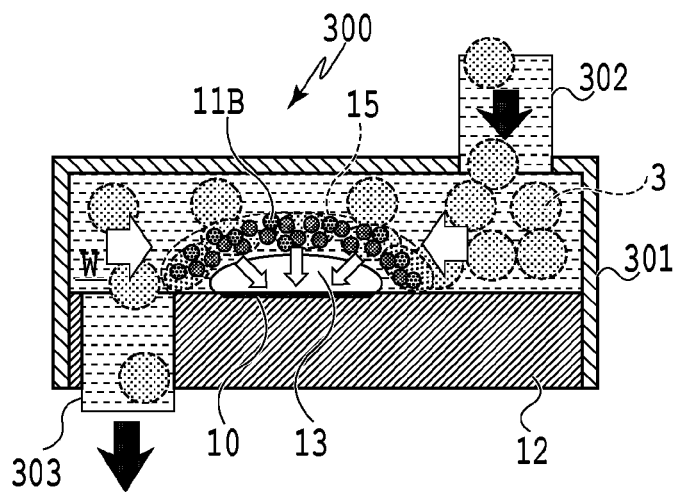
Figure 8C:
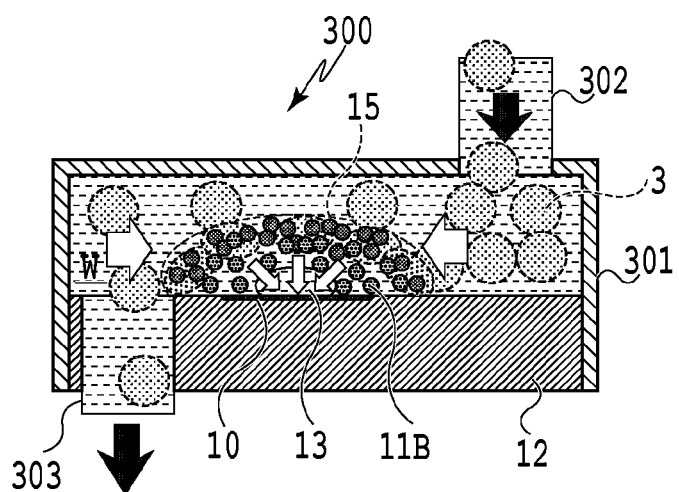
Figure 9A:
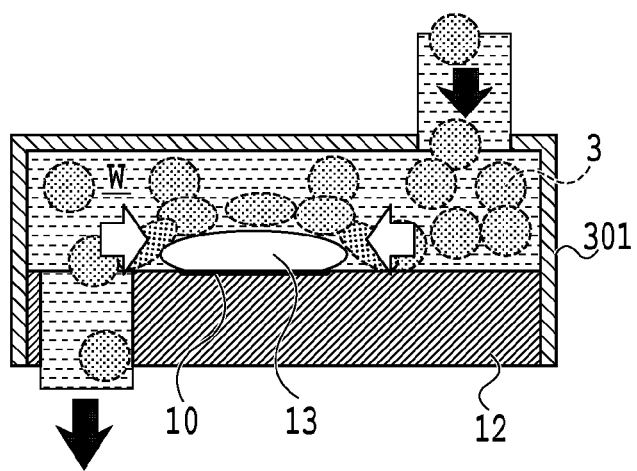
FIGS. 9A to 9C are diagrams illustrating the states of generation of UFBs caused by reheating of the liquid.
Figure 9B:
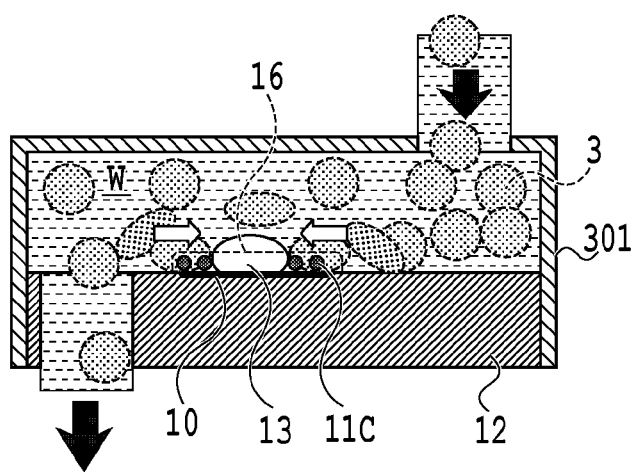
Figure 9C:
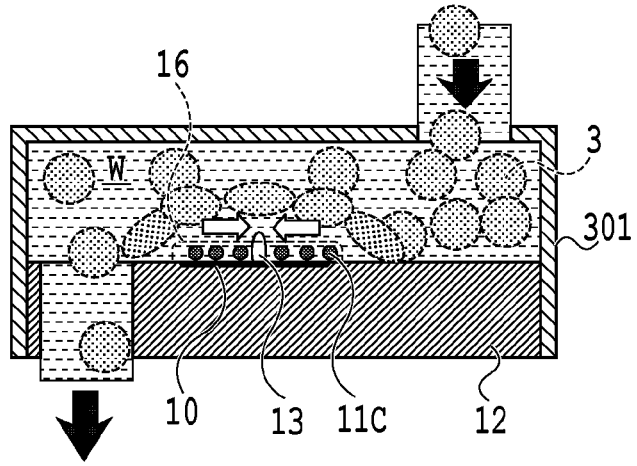

In the shrinking stage of the film boiling bubble 13, there are UFBs generated by the processes illustrated in FIGS. 8A to 8C (second UFBs 11B) and UFBs generated by the processes illustrated in FIGS. 9A to 9C (third UFBs 11C). It is considered that these two processes are made simultaneously.

FIGS. 8A to 8C are diagrams illustrating the states of generation of the UFBs 11 caused by the shrinkage of the film boiling bubble 13. FIG. 8A illustrates the state where the film boiling bubble 13 starts shrinking. Although the film boiling bubble 13 starts shrinking, the surrounding liquid W still has the inertial force in the expansion direction. Because of this, the inertial force acting in the direction of going away from the heating element 10 and the force going toward the heating element 10 caused by the shrinkage of the film boiling bubble 13 act in a surrounding region extremely close to the film boiling bubble 13, and the region is depressurized. The region is indicated in the drawings as a not-yet-bubbling negative pressure region 15.

The gas-dissolved liquid 3 within the not-yet-bubbling negative pressure region 15 exceeds the pressure dissolution limit and is vaporized to become an air bubble. The thus-vaporized air bubbles have diameters of about 100 nm and thereafter float independently in the liquid W without disappearing in a short time. In this embodiment, the air bubbles vaporized by the pressure action during the shrinkage of the film boiling bubble 13 are called the second UFBs 11B.

FIG. 8B illustrates a process of the shrinkage of the film boiling bubble 13. The shrinking speed of the film boiling bubble 13 is accelerated by the negative pressure, and the not-yet-bubbling negative pressure region 15 is also moved along with the shrinkage of the film boiling bubble 13. Specifically, in the process of the shrinkage of the film boiling bubble 13, the gas-dissolved liquids 3 within a part over the not-yet-bubbling negative pressure region 15 are precipitated one after another and become the second UFBs 11B.

FIG. 8C illustrates the state immediately before the disappearance of the film boiling bubble 13. Although the moving speed of the surrounding liquid W is also increased by the accelerated shrinkage of the film boiling bubble 13, a pressure loss occurs due to a flow passage resistance in the chamber 301. As a result, the region occupied by the not-yet-bubbling negative pressure region 15 is further increased, and a number of the second UFBs 11B are generated.

FIGS. 9A to 9C are diagrams illustrating the states of generation of the UFBs by reheating of the liquid W during the shrinkage of the film boiling bubble 13. FIG. 9A illustrates the state where the surface of the heating element 10 is covered with the shrinking film boiling bubble 13.

FIG. 9B illustrates the state where the shrinkage of the film boiling bubble 13 has progressed, and a part of the surface of the heating element 10 comes in contact with the liquid W. In this state, there is heat left on the surface of the heating element 10, but the heat is not high enough to cause the film boiling even if the liquid W comes in contact with the surface. A region of the liquid to be heated by coming in contact with the surface of the heating element 10 is indicated in the drawings as a not-yet-bubbling reheated region 16. Although the film boiling is not made, the gas-dissolved liquid 3 within the not-yet-bubbling reheated region 16 exceeds the thermal dissolution limit and is vaporized. In this embodiment, the air bubbles generated by the reheating of the liquid W during the shrinkage of the film boiling bubble 13 are called the third UFBs 11C.

FIG. 9C illustrates the state where the shrinkage of the film boiling bubble 13 has further progressed. The smaller the film boiling bubble 13, the greater the region of the heating element 10 in contact with the liquid W, and the third UFBs 11C are generated until the film boiling bubble 13 disappears.

Figure 10A:
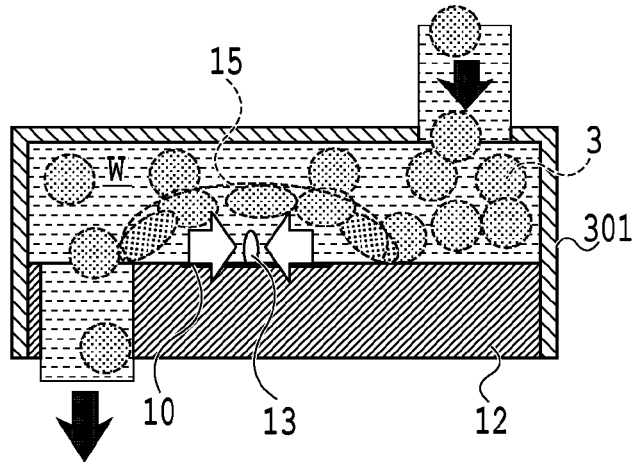
FIGS. 10A and 10B are diagrams illustrating the states of generation of UFBs caused by shock waves made by disappearance of the bubble generated by the film boiling.
Figure 10B:
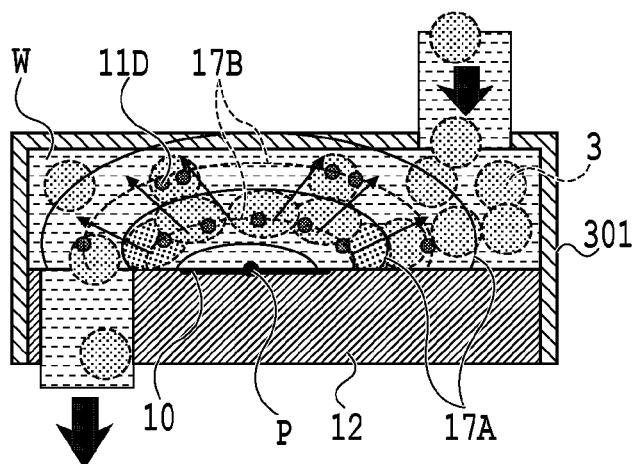

FIGS. 10A and 10B are diagrams illustrating the states of generation of the UFBs caused by an impact from the disappearance of the film boiling bubble 13 generated by the film boiling (that is, a type of cavitation). FIG. 10A illustrates the state immediately before the disappearance of the film boiling bubble 13. In this state, the film boiling bubble 13 shrinks rapidly by the internal negative pressure, and the not-yet-bubbling negative pressure region 15 surrounds the film boiling bubble 13.

FIG. 10B illustrates the state immediately after the film boiling bubble 13 disappears at a point P. When the film boiling bubble 13 disappears, acoustic waves ripple concentrically from the point P as a starting point due to the impact of the disappearance. The acoustic wave is a collective term of an elastic wave that is propagated through anything regardless of gas, liquid, and solid. In this embodiment, compression waves of the liquid W, which are a high pressure surface 17A and a low pressure surface 17B of the liquid W, are propagated alternately.

In this case, the gas-dissolved liquid 3 within the not-yet-bubbling negative pressure region 15 is resonated by the shock waves made by the disappearance of the film boiling bubble 13, and the gas-dissolved liquid 3 exceeds the pressure dissolution limit and the phase transition is made in timing when the low pressure surface 17B passes therethrough. Specifically, a number of air bubbles are vaporized in the not-yet-bubbling negative pressure region 15 simultaneously with the disappearance of the film boiling bubble 13. In this embodiment, the air bubbles generated by the shock waves made by the disappearance of the film boiling bubble 13 are called fourth UFBs 11D.

The fourth UFBs 11D generated by the shock waves made by the disappearance of the film boiling bubble 13 suddenly appear in an extremely short time (1 µS or less) in an extremely narrow thin film-shaped region. The diameter is sufficiently smaller than that of the first to third UFBs, and the gas-liquid interface energy is higher than that of the first to third UFBs. For this reason, it is considered that the fourth UFBs 11D have different characteristics from the first to third UFBs 11A to 11C and generate different effects.

Additionally, the fourth UFBs 11D are evenly generated in many parts of the region of the concentric sphere in which the shock waves are propagated, and the fourth UFBs 11D evenly exist in the chamber 301 from the generation thereof. Although many first to third UFBs already exist in the timing of the generation of the fourth UFBs 11D, the presence of the first to third UFBs does not affect the generation of the fourth UFBs 11D greatly. It is also considered that the first to third UFBs do not disappear due to the generation of the fourth UFBs 11D.

As described above, it is expected that the UFBs 11 are generated in the multiple stages from the generation to the disappearance of the film boiling bubble 13 by the heat generation of the heating element 10. The first UFBs 11A, the second UFBs 11B, and the third UFBs 11C are generated near the surface of the film boiling bubble generated by the film boiling. In this case, near means a region within about 20 μm from the surface of the film boiling bubble. The fourth UFBs 11D are generated in a region through which the shock waves are propagated when the air bubble disappears. Although the above example illustrates the stages to the disappearance of the film boiling bubble 13, the way of generating the UFBs is not limited thereto. For example, with the generated film boiling bubble 13 communicating with the atmospheric air before the bubble disappearance, the UFBs can be generated also if the film boiling bubble 13 does not reach the disappearance.

Next, remaining properties of the UFBs are described. The higher the temperature of the liquid, the lower the dissolution properties of the gas components, and the lower the temperature, the higher the dissolution properties of the gas components. In other words, the phase transition of the dissolved gas components is prompted and the generation of the UFBs becomes easier as the temperature of the liquid is higher. The temperature of the liquid and the solubility of the gas are in the inverse relationship, and the gas exceeding the saturation solubility is transformed into air bubbles and appeared in the liquid as the liquid temperature increases.

Therefore, when the temperature of the liquid rapidly increases from normal temperature, the dissolution properties are decreased without stopping, and the generation of the UFBs starts. The thermal dissolution properties are decreased as the temperature increases, and a number of the UFBs are generated.

Conversely, when the temperature of the liquid decreases from normal temperature, the dissolution properties of the gas are increased, and the generated UFBs are more likely to be liquefied. However, such temperature is sufficiently lower than normal temperature. Additionally, since the once generated UFBs have a high internal pressure and large gas-liquid interface energy even when the temperature of the liquid decreases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the first UFBs 11A described with FIGS. 7A to 7C and the third UFBs 11C described with FIGS. 9A to 9C can be described as UFBs that are generated by utilizing such thermal dissolution properties of gas.

On the other hand, in the relationship between the pressure and the dissolution properties of liquid, the higher the pressure of the liquid, the higher the dissolution properties of the gas, and the lower the pressure, the lower the dissolution properties. In other words, the phase transition to the gas of the gas-dissolved liquid dissolved in the liquid is prompted and the generation of the UFBs becomes easier as the pressure of the liquid is lower. Once the pressure of the liquid becomes lower than normal pressure, the dissolution properties are decreased instantly, and the generation of the UFBs starts. The pressure dissolution properties are decreased as the pressure decreases, and a number of the UFBs are generated.

Conversely, when the pressure of the liquid increases to be higher than normal pressure, the dissolution properties of the gas are increased, and the generated UFBs are more likely to be liquefied. However, such pressure is sufficiently higher than the atmospheric pressure. Additionally, since the once generated UFBs have a high internal pressure and large gas-liquid interface energy even when the pressure of the liquid increases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the second UFBs 11B described with FIGS. 8A to 8C and the fourth UFBs 11D described with FIGS. 10A to 10C can be described as UFBs that are generated by utilizing such pressure dissolution properties of gas.

Those first to fourth UFBs generated by different causes are described individually above; however, the above-described generation causes occur simultaneously with the event of the film boiling. Thus, at least two types of the first to the fourth UFBs may be generated at the same time, and these generation causes may cooperate to generate the UFBs. It should be noted that it is common for all the generation causes to be induced by the volume change of the film boiling bubble generated by the film boiling phenomenon. In this specification, the method of generating the UFBs by utilizing the film boiling caused by the rapid heating as described above is referred to as a thermal-ultrafine bubble (T-UFB) generating method. Additionally, the UFBs generated by the T-UFB generating method are referred to as T-UFBs, and the liquid containing the T-UFBs generated by the T-UFB generating method is referred to as a T-UFB-containing liquid.

Almost all the air bubbles generated by the T-UFB generating method are 1.0 μm or less, and milli-bubbles and microbubbles are unlikely to be generated. That is, the T-UFB generating method allows dominant and efficient generation of the UFBs. Additionally, the T-UFBs generated by the T-UFB generating method have larger gas-liquid interface energy than that of the UFBs generated by a conventional method, and the T-UFBs do not disappear easily as long as being stored at normal temperature and normal pressure. Moreover, even if new T-UFBs are generated by new film boiling, it is possible to prevent disappearance of the already generated T-UFBs due to the impact from the new generation. That is, it can be said that the number and the concentration of the T-UFBs contained in the T-UFB-containing liquid have the hysteresis properties depending on the number of times the film boiling is made in the T-UFB-containing liquid. In other words, it is possible to adjust the concentration of the T-UFBs contained in the T-UFB-containing liquid by controlling the number of the heating elements provided in the T-UFB generating unit 300 and the number of the voltage pulse application to the heating elements.

Reference to FIG. 1 is made again. Once the T-UFB-containing liquid W with a desired UFB concentration is generated in the T-UFB generating unit 300, the UFB-containing liquid W is supplied to the post-processing unit 400.

Figure 11A:
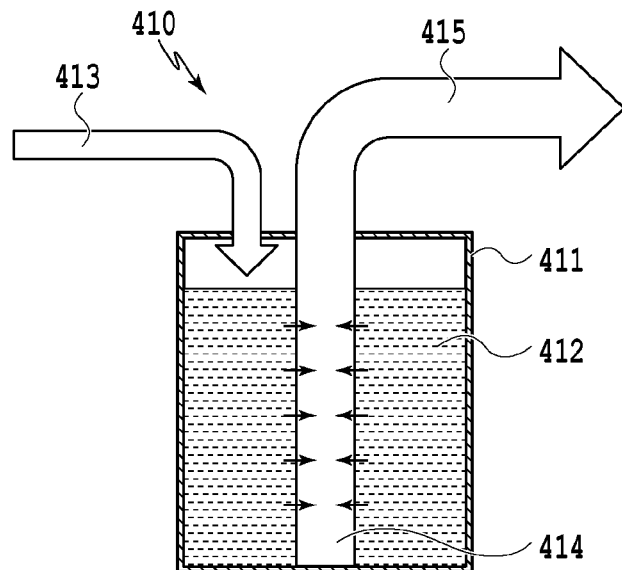
FIGS. 11A to 11C are diagrams illustrating a configuration example of a post-processing unit.
Figure 11B:
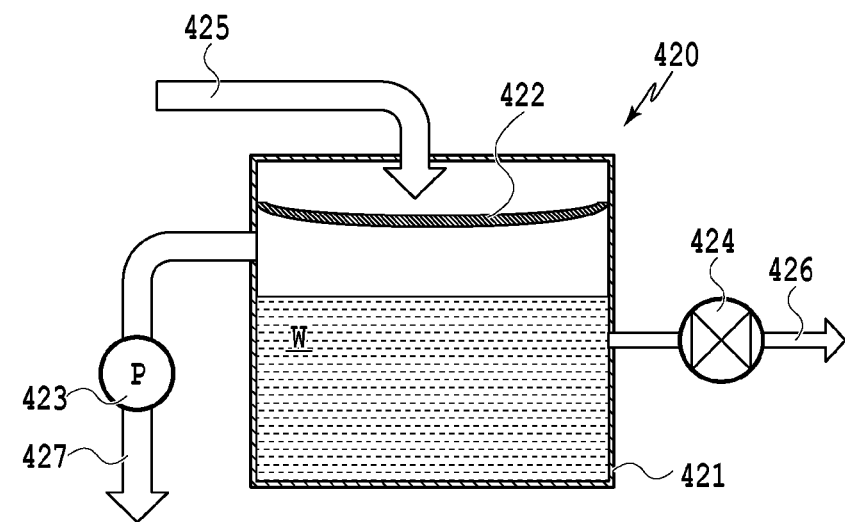
Figure 11C:
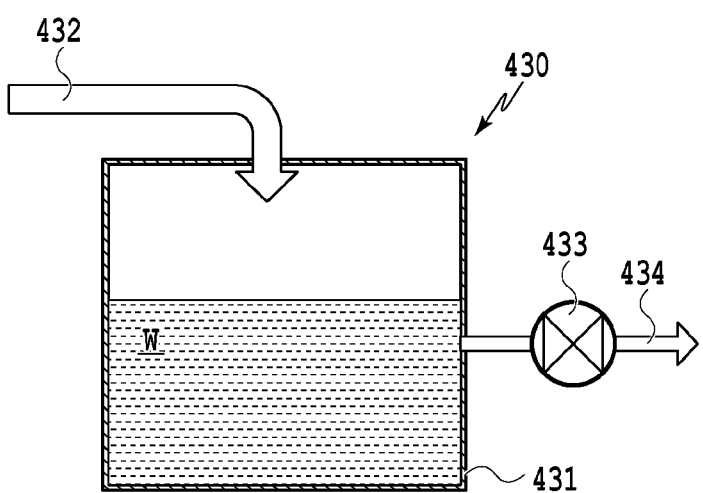

FIGS. 11A to 11C are diagrams illustrating configuration examples of the post-processing unit 400 of this embodiment. The post-processing unit 400 of this embodiment removes impurities in the UFB-containing liquid W in stages in the order from inorganic ions, organic substances, and insoluble solid substances.

FIG. 11A illustrates a first post-processing mechanism 410 that removes the inorganic ions. The first post-processing mechanism 410 includes an exchange container 411, cation exchange resins 412, a liquid introduction passage 413, a collecting pipe 414, and a liquid discharge passage 415. The exchange container 411 stores the cation exchange resins 412. The UFB-containing liquid W generated by the T-UFB generating unit 300 is injected to the exchange container 411 through the liquid introduction passage 413 and absorbed into the cation exchange resins 412 such that the cations as the impurities are removed. Such impurities include metal materials and the like peeled off from the element substrate 12 of the T-UFB generating unit 300. For example, the metal materials may be compounds such as $SiO_2$, SiN, SiC, Ta, $Al_2O_3$, and $Ta_2O_5$, an amorphous alloy containing Si, AL, W, Pt, Pd, Ta, Fe, Cr, Ni, and the like, and platinum group metals such as Ir, and Ru.

The cation exchange resins 412 are synthetic resins in which a functional group (ion exchange group) is introduced in a high polymer matrix having a three-dimensional network, and the appearance of the synthetic resins are spherical particles of around 0.4 to 0.7 mm. A general high polymer matrix is the styrene-divinylbenzene copolymer, and the functional group may be that of methacrylic acid series and acrylic acid series, for example. However, the above material is an example. As long as the material can remove desired inorganic ions effectively, the above material can be changed to various materials. The UFB-containing liquid W absorbed in the cation exchange resins 412 to remove the inorganic ions is collected by the collecting pipe 414 and transferred to the next step through the liquid discharge passage 415. In this process in the present embodiment, not all the inorganic ions contained in the UFB-containing liquid W supplied from the liquid introduction passage 413 need to be removed as long as at least a part of the inorganic ions are removed.

FIG. 11B illustrates a second post-processing mechanism 420 that removes the organic substances. The second post-processing mechanism 420 includes a storage container 421, a filtration filter 422, a vacuum pump 423, a valve 424, a liquid introduction passage 425, a liquid discharge passage 426, and an air suction passage 427. Inside of the storage container 421 is divided into upper and lower two regions by the filtration filter 422. The liquid introduction passage 425 is connected to the upper region of the upper and lower two regions, and the air suction passage 427 and the liquid discharge passage 426 are connected to the lower region thereof. Once the vacuum pump 423 is driven with the valve 424 closed, the air in the storage container 421 is discharged through the air suction passage 427 to make the pressure inside the storage container 421 negative pressure, and the UFB-containing liquid W is thereafter introduced from the liquid introduction passage 425. Then, the UFB-containing liquid W from which the impurities are removed by the filtration filter 422 is reserved into the storage container 421.

The impurities removed by the filtration filter 422 include organic materials that may be mixed at a tube or each unit, such as organic compounds including silicon, siloxane, and epoxy, for example. A filter film usable for the filtration filter 422 includes a filter of a sub-μm-mesh (a filter of 1 μm or smaller in mesh diameter) that can remove bacteria, and a filter of a nm-mesh that can remove virus. The filtration filter having such a fine opening diameter may remove air bubbles larger than the opening diameter of the filter. Particularly, there may be the case where the filter is clogged by the fine air bubbles adsorbed to the openings (mesh) of the filter, which may slowdown the filtering speed. However, as described above, most of the air bubbles generated by the T-UFB generating method described in the present embodiment of the invention are in the size of 1 μm or smaller in diameter, and milli-bubbles and microbubbles are not likely to be generated. That is, since the probability of generating milli-bubbles and microbubbles is extremely low, it is possible to suppress the slowdown in the filtering speed due to the adsorption of the air bubbles to the filter. For this reason, it is favorable to apply the filtration filter 422 provided with the filter of 1 μm or smaller in mesh diameter to the system having the T-UFB generating method.

Examples of the filtration applicable to this embodiment may be a so-called dead-end filtration and cross-flow filtration. In the dead-end filtration, the direction of the flow of the supplied liquid and the direction of the flow of the filtration liquid passing through the filter openings are the same, and specifically, the directions of the flows are made along with each other. In contrast, in the cross-flow filtration, the supplied liquid flows in a direction along a filter surface, and specifically, the direction of the flow of the supplied liquid and the direction of the flow of the filtration liquid passing through the filter openings are crossed with each other. It is preferable to apply the cross-flow filtration to suppress the adsorption of the air bubbles to the filter openings.

After a certain amount of the UFB-containing liquid W is reserved in the storage container 421, the vacuum pump 423 is stopped and the valve 424 is opened to transfer the T-UFB-containing liquid in the storage container 421 to the next step through the liquid discharge passage 426. Although the vacuum filtration method is employed as the method of removing the organic impurities herein, a gravity filtration method and a pressurized filtration can also be employed as the filtration method using a filter, for example.

FIG. 11C illustrates a third post-processing mechanism 430 that removes the insoluble solid substances. The third post-processing mechanism 430 includes a precipitation container 431, a liquid introduction passage 432, a valve 433, and a liquid discharge passage 434.

First, a predetermined amount of the UFB-containing liquid W is reserved into the precipitation container 431 through the liquid introduction passage 432 with the valve 433 closed, and leaving it for a while. Meanwhile, the solid substances in the UFB-containing liquid W are precipitated onto the bottom of the precipitation container 431 by gravity. Among the bubbles in the UFB-containing liquid, relatively large bubbles such as microbubbles are raised to the liquid surface by the buoyancy and also removed from the UFB-containing liquid. After a lapse of sufficient time, the valve 433 is opened, and the UFB-containing liquid W from which the solid substances and large bubbles are removed is transferred to the collecting unit 500 through the liquid discharge passage 434. The example of applying the three post-processing mechanisms in sequence is shown in this embodiment; however, it is not limited thereto, and the order of the three post-processing mechanisms may be changed, or at least one needed post-processing mechanism may be employed.

With the above-described removal processing for removing the impurities included in the post-processing, it is possible to increase the purity of the contained T-UFBs in the generated T-UFB-containing liquid.

Reference to FIG. 1 is made again. The T-UFB-containing liquid W from which the impurities are removed by the post-processing unit 400 may be directly transferred to the collecting unit 500 or may be put back to the dissolving unit 200 again to implement a circulation system. In the latter case, the post-processing unit 400 functions as a unit performing the pre-processing on the liquid supplied to the dissolving unit 200. In the case where the UFB-containing liquid after the T-UFBs are generated is put back again to the dissolving unit 200, the gas dissolution concentration of the T-UFB-containing liquid W that is decreased due to the generation of the T-UFBs can be increased. Preferably, the gas dissolution concentration can be compensated to the saturated state again by the dissolving unit 200. If new T-UFBs are generated by the T-UFB generating unit 300 after the compensation, it is possible to further increase the concentration of the UFBs contained in the T-UFB-containing liquid with the above-described properties. That is, it is possible to increase the concentration of the contained UFBs by the number of circulations through the dissolving unit 200, the T-UFB generating unit 300, and the post-processing unit 400, and it is possible to transfer the UFB-containing liquid W to the collecting unit 500 after a predetermined concentration of the contained UFBs is obtained. This embodiment shows a form in which the UFB-containing liquid processed by the post-processing unit 400 is put back to the dissolving unit 200 and circulated; however, it is not limited thereto, and the UFB-containing liquid after passing through the T-UFB generating unit may be put back again to the dissolving unit 200 before being supplied to the post-processing unit 400 such that the post-processing is performed by the post-processing unit 400 after the T-UFB concentration is increased through multiple times of circulation, for example.

Now, the effect of putting back the generated T-UFB-containing liquid W to the dissolving unit 200 again is simply described according to the results of the specific verification conducted by the inventors. First, 10000 pieces of the heating elements 10 were arranged on the element substrate 12 in the T-UFB generating unit 300. Industrial pure water was used as the liquid W, and the liquid W flowed in the chamber 301 of the T-UFB generating unit 300 at the velocity of a flowing fluid of 1.0 liter/hour. In this state, a voltage pulse of a voltage of 24 V and a pulse width of 1.0 µs was applied to each of the heating elements at a driving frequency of 10 KHz.

The generated T-UFB-containing liquid W was not put back to the dissolving unit 200 and collected by the collecting unit 500, or the number of times of the circulation was one, and about 3.6 billion pieces of the UFBs per 1.0 mL were confirmed in the T-UFB-containing liquid W collected by the collecting unit 500. On the other hand, as a result of performing ten times the operation of putting back the T-UFB-containing liquid W to the dissolving unit 200, or the number of times of the circulation was ten times, about 36 billion pieces of the UFBs per 1.0 mL were confirmed in the T-UFB-containing liquid W collected by the collecting unit 500. In other words, it was confirmed that the concentration of the contained UFBs is increased approximately in proportion to the number of times of the circulation. The above-described number density of the UFBs was obtained by counting UFBs 11 of less than 1.0 µm in diameter contained in the UFB-containing liquid W of a predetermined volume with a measuring instrument produced by Shimadzu Corporation (model number SALD-7500).

As described above, with the liquid circulated through the dissolving unit 200, the T-UFB generating unit 300, and the post-processing unit 400 by way of the circulation route in this order, it is possible to generate a liquid with a desired UFB concentration.

The collecting unit 500 collects and preserves the UFB-containing liquid W transferred from the post-processing unit 400. The T-UFB-containing liquid collected by the collecting unit 500 is a UFB-containing liquid with high purity from which various impurities are removed.

In the collecting unit 500, the UFB-containing liquid W may be classified by the size of the T-UFBs by performing some stages of filtration processing. Since it is expected that the temperature of the T-UFB-containing liquid W obtained by the T-UFB method is higher than normal temperature, the collecting unit 500 may be provided with a cooling unit. The cooling unit may be provided to a part of the post-processing unit 400.

The schematic description of the UFB generating apparatus 1 is given above; however, it is needless to say that the illustrated multiple units can be changed, and not all of them need to be prepared. Depending on the type of the liquid W and the gas G to be used and the intended use of the T-UFB-containing liquid to be generated, a part of the above-described units may be omitted, or another unit other than the above-described units may be added.

For example, when the gas to be contained by the UFBs is the atmospheric air, the degassing unit as the pre-processing unit 100 and the dissolving unit 200 can be omitted. On the other hand, in a case where multiple kinds of gases are desired to be contained by the UFBs, another dissolving unit 200 may be added. It is also possible to integrate the functions of some units illustrated in FIG. 1 into one unit. For example, the dissolving unit 200 and the T-UFB generating unit 300 can be integrated with each other by arranging the heating element 10 in the dissolving container 201 illustrated in FIGS. 3A and 3B. In this case, the dissolving of a gas and the generation of the T-UFBs containing the gas are executed simultaneously in the single unit.

The units for removing the impurities as described in FIGS. 11A to 11C may be provided upstream of the T-UFB generating unit 300 as a part of the pre-processing unit or may be provided both upstream and downstream thereof. When the liquid to be supplied to the UFB generating apparatus is tap water, rain water, contaminated water, or the like, there may be included organic and inorganic impurities in the liquid. If such a liquid W including the impurities is supplied to the T-UFB generating unit 300, there is a risk of deteriorating the heating element 10 and inducing the salting-out phenomenon. With the mechanisms as illustrated in FIGS. 11A to 11C provided upstream of the T-UFB generating unit 300, it is possible to remove the above-described impurities in advance and to generate an UFB-containing liquid with high purity more efficiently.

<<Modification of Post-Processing Unit>>

Figure 12:
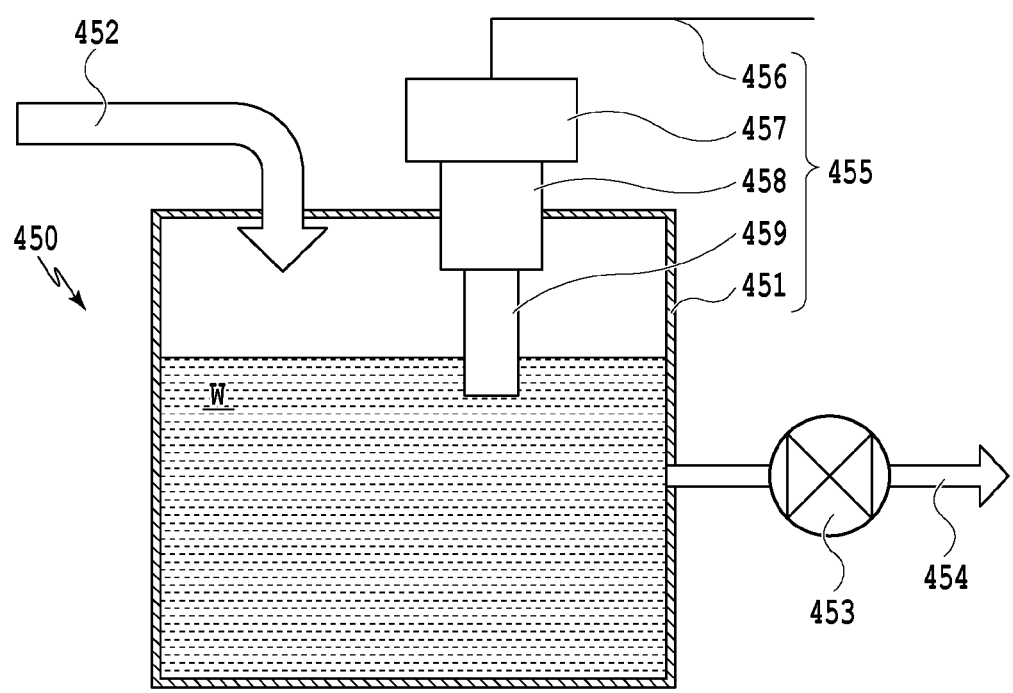
FIG. 12 is a diagram illustrating a fourth post-processing mechanism.

FIG. 12 illustrates a fourth post-processing mechanism 450 that can be added to or replaced with each post-processing unit 400 described above. The fourth post-processing mechanism 450 is an increasing processing unit that uses ultrasonic vibrations to further increase the amount of the T-UFBs contained in the T-UFB-containing liquid W.

The fourth post-processing mechanism 450 includes a storage container 451, a vibration generation unit 455, a liquid introduction passage 452, a valve 453, and a liquid discharge passage 454. The vibration generation unit 455 includes a cable 456, a transducer 457, a booster 458, and a horn 459, and the power supplied through the cable 456 is converted into mechanical vibration amplitude by the transducer 457 and then increased by the booster 458 to vibrate the horn 459.

In the case of operating the post-processing mechanism 450, first, the T-UFB-containing liquid W is stored in the storage container 451 through the liquid introduction passage 452 with the valve 453 closed. The amount of the T-UFB-containing liquid W to be stored is about an amount which at least allows a tip end of the horn 459 to be put in the T-UFB-containing liquid W. Then, with the T-UFB-containing liquid W stored and the storage container being open to the atmospheric air, the vibration generation unit 455 is driven to vibrate the horn 459 put in the T-UFB-containing liquid W. Consequently, the ultrasonic vibrations are generated in the T-UFB-containing liquid W in which the tip end of the horn 459 is put, and the number of the T-UFBs is increased.

In this process, for efficiency, the vibration generation unit 455 is preferably driven repeatedly at predetermined intervals for each predetermined time. It is possible to adjust the concentration of the contained T-UFBs by changing the frequency and the time period and the number of times of the vibration of the horn 459.

The vibration generation unit 455 is stopped and the valve 453 is opened after repeating the predetermined number of times of the vibration for a predetermined time period, and then the T-UFB-containing liquid W adjusted to have a desired contained concentration is transferred to the collecting unit 500 through the liquid discharge passage 454.

The details of the specific verification using the T-UFB generating unit 300 and the post-processing unit 400 including the fourth post-processing mechanism 450 conducted by the inventors are described below. First, 10000 pieces of the heating elements 10 were arranged on the element substrate 12 in the T-UFB generating unit 300. Industrial pure water was used as the liquid W, and the liquid W flowed in the chamber 301 of the T-UFB generating unit 300 at the velocity of a flowing fluid of 1.0 liter/hour. In this state, a voltage pulse of a voltage of 24 V and a pulse width of 1.0 µs was applied to each of the heating elements at a driving frequency of 10 KHz.

The generated T-UFB-containing liquid W was directly collected by the collecting unit 500, and 3.6 billion pieces of the UFBs per 1.0 mL were confirmed in the collected T-UFB-containing liquid W by checking the concentration of the contained UFBs. On the other hand, as a result of supplying the generated T-UFB-containing liquid W to the fourth post-processing mechanism 450 and performing ten times an operation of vibrating the horn 459 at 100 KHz, 80 W for one second, about 72 billion pieces of the UFBs per 1.0 mL were confirmed in the collected T-UFB-containing liquid W. In other words, the concentration of the contained UFBs could be increased by applying the ultrasonic vibrations by the fourth post-processing mechanism 450. The above-described number density of the UFBs was obtained by counting the UFBs 11 of less than 1.0 µm in diameter contained in the UFB-containing liquid W of a predetermined volume with a measuring instrument produced by Shimadzu Corporation (model number SALD-7500).

An example of a preferable condition for increasing the UFBs by applying the ultrasonic vibrations to the T-UFB-containing liquid like this embodiment is described below. An ultrasonic horn is put in the T-UFB-containing water communicating with the atmospheric air in the container, and an operation of vibrating the horn at 50 to 500 KHz, 50 to 100 W is performed for one to five seconds. More preferably, the operation is repeated about two to ten times. In the case of applying the ultrasound from the outside of the storage container of the T-UFB-containing liquid through the container, an operation of vibrating the horn at 1 to 10 KHz, 10 to 50 W is performed for 20 to 50 seconds with the inside of the container communicating with the atmospheric air. Alternatively, application for five to ten seconds is repeated about two to ten times.

As a comparison, almost no UFBs were confirmed in the liquid collected in the case where the industrial pure water was directly supplied to the fourth post-processing mechanism 450 and the same ultrasonic vibrations as the above were applied. That is, the fourth post-processing mechanism 450 applying the ultrasonic vibrations is not for generating new UFBs in the liquid containing no UFBs but is having a function of increasing the number of the UFBs in the liquid already containing the UFBs.

Figure 13:
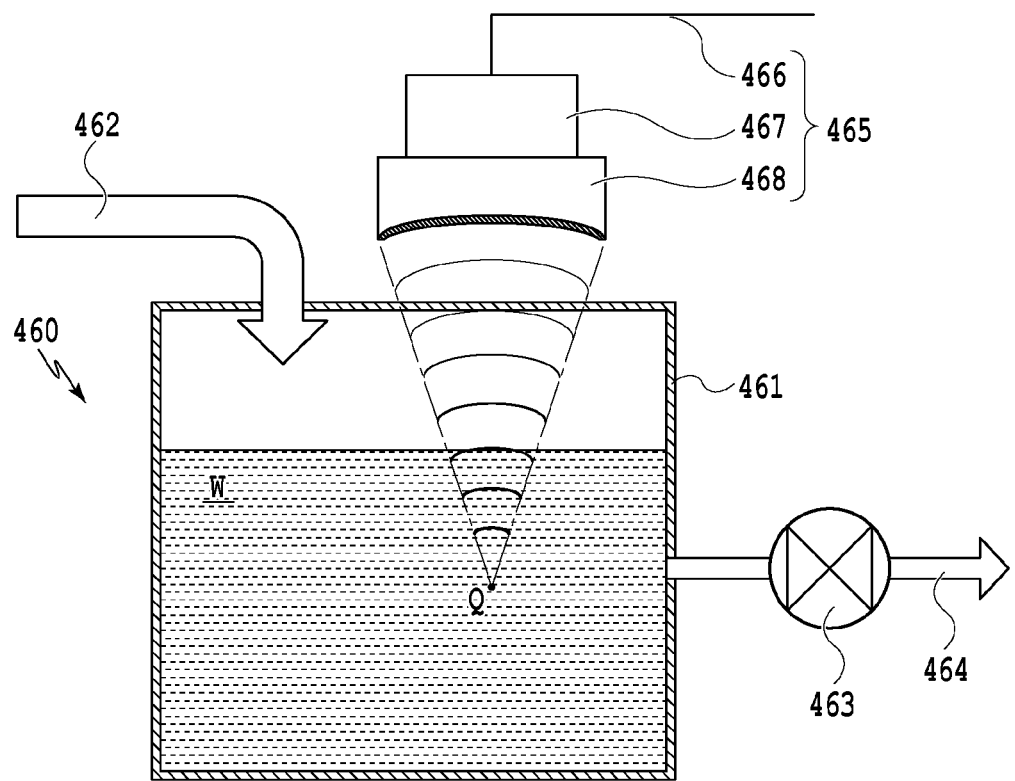
FIG. 13 is a diagram illustrating a fifth post-processing mechanism.

FIG. 13 illustrates a fifth post-processing mechanism 460 that can be added to or replaced with the post-processing unit 400 described above. The fifth post-processing mechanism 460 is an increasing processing unit that uses high intensity focused ultrasound (HIFU) to further increase the amount of the T-UFBs contained in the T-UFB-containing liquid W.

The fifth post-processing mechanism 460 includes a storage container 461, a vibration generation unit 465, a liquid introduction passage 462, a valve 463, and a liquid discharge passage 464. The vibration generation unit 465 includes a cable 466, a transducer 467, and an ultrasonic probe 468. Once the power is supplied through the cable 466, the transducer 467 converts the power into mechanical vibration frequencies, and then the ultrasonic probe 468 generates ultrasound in the MHz band. The generated ultrasound is focused in a position about several mm to several ten mm away from the ultrasonic probe 468, and rapid heating and cavitation are caused in the focusing place.

Such rapid heating and cavitation cause the UFBs around the focusing place to waver, and to split depending on the condition. Additionally, in the case where the generation of the ultrasound by the ultrasonic probe 468 is continued, the UFBs around the focusing place are broken, and a greater number of UFBs are generated as a result.

The vibration generation unit 465 is stopped and the valve 463 is opened after a lapse of a predetermined time from the generation of the ultrasound, and then the T-UFB-containing liquid W adjusted to have a desired contained concentration is transferred to the collecting unit 500 through the liquid discharge passage 464.

The details of the specific verification using the T-UFB generating unit 300 and the post-processing unit 400 including the fifth post-processing mechanism 460 conducted by the inventors are described below. First, 10000 pieces of the heating elements 10 were arranged on the element substrate 12 in the T-UFB generating unit 300. Industrial pure water was used as the liquid W, and the liquid W flowed in the chamber 301 of the T-UFB generating unit 300 at the velocity of a flowing fluid of 1.0 liter/hour. In this state, a voltage pulse of a voltage of 24 V and a pulse width of 1.0 µs was applied to each of the heating elements at a driving frequency of 10 KHz.

The generated T-UFB-containing liquid W was directly collected by the collecting unit 500, and 3.6 billion pieces of the UFBs per 1.0 mL were confirmed in the collected T-UFB-containing liquid W by checking the concentration of the contained UFBs. On the other hand, as a result of supplying the generated T-UFB-containing liquid W to the fifth post-processing mechanism 460 and generating the ultrasound by the ultrasonic probe 468 at 3.0 MHz, 36 W for 20 seconds, about 10.8 billion pieces of the UFBs per 1.0 mL were confirmed in the collected T-UFB-containing liquid W. In other words, the concentration of the contained UFBs could be increased by applying the focused ultrasound by the fifth post-processing mechanism 460. The above-described number density of the UFBs was obtained by counting the UFBs 11 of less than 1.0 µm in diameter contained in the UFB-containing liquid W of a predetermined volume with the measuring instrument produced by Shimadzu Corporation (model number SALD-7500).

As a comparison, almost no UFBs were confirmed in the liquid collected in the case where the industrial pure water was directly supplied to the fifth post-processing mechanism 460 and the same focused ultrasound as the above were applied. That is, the fifth post-processing mechanism 460 applying the focused ultrasound is not for generating new UFBs in the liquid containing no UFBs but is having a function of increasing the number of the UFBs in the liquid already containing the UFBs.

<<Liquid and Gas Usable for T-UFB-Containing Liquid>>

Now, the liquid W usable for generating the T-UFB-containing liquid is described. The liquid W usable in this embodiment is, for example, pure water, ion exchange water, distilled water, bioactive water, magnetic active water, lotion, tap water, sea water, river water, clean and sewage water, lake water, underground water, rain water, and so on. A mixed liquid containing the above liquid and the like is also usable. A mixed solvent containing water and soluble organic solvent can be also used. The soluble organic solvent to be used by being mixed with water is not particularly limited; however, the followings can be a specific example thereof. An alkyl alcohol group of the carbon number of 1 to 4 including methyl alcohol, ethyl alcohol, n-propyl alcohol, isopropyl alcohol, n-butyl alcohol, sec-butyl alcohol, and tert-butyl alcohol. An amide group including N-methyl-2-pyrrolidone, 2-pyrrolidone, 1,3-dimethyl-2-imidazolidinone, N,N-dimethylformamide, and N,N-dimethylacetamide. A keton group or a ketoalcohol group including acetone and diacetone alcohol. A cyclic ether group including tetrahydrofuran and dioxane. A glycol group including ethylene glycol, 1,2-propylene glycol, 1,3-propylene glycol, 1,2-butanediol, 1,3-butanediol, 1,4-butanediol, 1,5-pentanediol, 1,2-hexanediol, 1,6-hexanediol, 3-methyl-1,5-pentanediol, diethylene glycol, triethylene glycol, and thiodiglycol. A group of lower alkyl ether of polyhydric alcohol including ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. A polyalkylene glycol group including polyethylene glycol and polypropylene glycol. A triol group including glycerin, 1,2,6-hexanetriol, and trimethylolpropane. These soluble organic solvents can be used individually, or two or more of them can be used together.

A gas component that can be introduced into the dissolving unit 200 is, for example, hydrogen, helium, oxygen, nitrogen, methane, fluorine, neon, carbon dioxide, ozone, argon, chlorine, ethane, propane, air, and so on. The gas component may be a mixed gas containing some of the above. Additionally, it is not necessary for the dissolving unit 200 to dissolve a substance in a gas state, and the dissolving unit 200 may fuse a liquid or a solid containing desired components into the liquid W. The dissolution in this case may be spontaneous dissolution, dissolution caused by pressure application, or dissolution caused by hydration, ionization, and chemical reaction due to electrolytic dissociation.

<<Effects of T-UFB Generating Method>>

Next, the characteristics and the effects of the above-described T-UFB generating method are described by comparing with a conventional UFB generating method. For example, in a conventional air bubble generating apparatus as represented by the Venturi method, a mechanical depressurizing structure such as a depressurizing nozzle is provided in a part of a flow passage. A liquid flows at a predetermined pressure to pass through the depressurizing structure, and air bubbles of various sizes are generated in a downstream region of the depressurizing structure.

In this case, among the generated air bubbles, since the relatively large bubbles such as milli-bubbles and microbubbles are affected by the buoyancy, such bubbles rise to the liquid surface and disappear. Even the UFBs that are not affected by the buoyancy may also disappear with the milli-bubbles and microbubbles since the gas-liquid interface energy of the UFBs is not very large. Additionally, even if the above-described depressurizing structures are arranged in series, and the same liquid flows through the depressurizing structures repeatedly, it is impossible to store for a long time the UFBs of the number corresponding to the number of repetitions. In other words, it has been difficult for the UFB-containing liquid generated by the conventional UFB generating method to maintain the concentration of the contained UFBs at a predetermined value for a long time.

In contrast, in the T-UFB generating method of this embodiment utilizing the film boiling, a rapid temperature change from normal temperature to about 300° C. and a rapid pressure change from normal pressure to around a several megapascal occur locally in a part extremely close to the heating element. The heating element is a rectangular shape having one side of around several tens to hundreds of μm. It is around $\frac{1}{10}$ to $\frac{1}{1000}$ of the size of a conventional UFB generating unit. Additionally, with the gas-dissolved liquid within the extremely thin film region of the film boiling bubble surface exceeding the thermal dissolution limit or the pressure dissolution limit instantaneously (in an extremely short time under microseconds), the phase transition occurs and the gas-dissolved liquid is precipitated as the UFBs. In this case, the relatively large bubbles such as milli-bubbles and microbubbles are hardly generated, and the liquid contains the UFBs of about 100 nm in diameter with extremely high purity. Moreover, since the T-UFBs generated in this way have sufficiently large gas-liquid interface energy, the T-UFBs are not broken easily under the normal environment and can be stored for a long time.

Particularly, the present invention using the film boiling phenomenon that enables local formation of a gas interface in the liquid can form an interface in a part of the liquid close to the heating element without affecting the entire liquid region, and a region on which the thermal and pressure actions performed can be extremely local. As a result, it is possible to stably generate desired UFBs. With further more conditions for generating the UFBs applied to the generation liquid through the liquid circulation, it is possible to additionally generate new UFBs with small effects on the already-made UFBs. As a result, it is possible to produce a UFB liquid of a desired size and concentration relatively easily.

Moreover, since the T-UFB generating method has the above-described hysteresis properties, it is possible to increase the concentration to a desired concentration while keeping the high purity. In other words, according to the T-UFB generating method, it is possible to efficiently generate a long-time storable UFB-containing liquid with high purity and high concentration.

<<Specific Usage of T-UFB-Containing Liquid>>

In general, applications of the ultrafine bubble-containing liquids are distinguished by the type of the containing gas. Any type of gas can make the UFBs as long as an amount of around PPM to BPM of the gas can be dissolved in the liquid. For example, the ultrafine bubble-containing liquids can be applied to the following applications.

A UFB-containing liquid containing air can be preferably applied to cleansing in the industrial, agricultural and fishery, and medical scenes and the like, and to cultivation of plants and agricultural and fishery products.

A UFB-containing liquid containing ozone can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing nitrogen can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing oxygen can be preferably applied to cleansing application in the industrial, agricultural and fishery, and medical scenes and the like, and to cultivation of plants and agricultural and fishery products.

A UFB-containing liquid containing carbon dioxide can be preferably applied to not only cleansing application in the industrial, agricultural and fishery, and medical scenes and the like, but to also applications intended to disinfection, sterilization, and decontamination, for example.

A UFB-containing liquid containing perfluorocarbons as a medical gas can be preferably applied to ultrasonic diagnosis and treatment. As described above, the UFB-containing liquids can exert the effects in various fields of medical, chemical, dental, food, industrial, agricultural and fishery, and so on.

In each of the applications, the purity and the concentration of the UFBs contained in the UFB-containing liquid are important for quickly and reliably exert the effect of the UFB-containing liquid. In other words, unprecedented effects can be expected in various fields by utilizing the T-UFB generating method of this embodiment that enables generation of the UFB-containing liquid with high purity and desired concentration. Here is below a list of the applications in which the T-UFB generating method and the T-UFB-containing liquid are expected to be preferably applicable.

(A) Liquid Purification Application

With the T-UFB generating unit provided to a water clarification unit, enhancement of an effect of water clarification and an effect of purification of PH adjustment liquid is expected. The T-UFB generating unit may also be provided to a carbonated water server.

With the T-UFB generating unit provided to a humidifier, aroma diffuser, coffee maker, and the like, enhancement of a humidifying effect, a deodorant effect, and a scent spreading effect in a room is expected.

If the UFB-containing liquid in which an ozone gas is dissolved by the dissolving unit is generated and is used for dental treatment, burn treatment, and wound treatment using an endoscope, enhancement of a medical cleansing effect and an antiseptic effect is expected.

With the T-UFB generating unit provided to a water storage tank of a condominium, enhancement of a water clarification effect and chlorine removing effect of drinking water to be stored for a long time is expected.

If the T-UFB-containing liquid containing ozone or carbon dioxide is used for brewing process of Japanese sake, shochu, wine, and so on in which the high-temperature pasteurization processing cannot be performed, more efficient pasteurization processing than that with the conventional liquid is expected.

If the UFB-containing liquid is mixed into the ingredient in a production process of the foods for specified health use and the foods with functional claims, the pasteurization processing is possible, and thus it is possible to provide safe and functional foods without a loss of flavor.

With the T-UFB generating unit provided to a supplying route of sea water and fresh water for cultivation in a cultivation place of fishery products such as fish and pearl, prompting of spawning and growing of the fishery products is expected.

With the T-UFB generating unit provided in a purification process of water for food preservation, enhancement of the preservation state of the food is expected.

With the T-UFB generating unit provided in a bleaching unit for bleaching pool water or underground water, a higher bleaching effect is expected.

With the T-UFB-containing liquid used for repairing a crack of a concrete member, enhancement of the effect of crack repairment is expected.

With the T-UFBs contained in liquid fuel for a machine using liquid fuel (such as automobile, vessel, and airplane), enhancement of energy efficiency of the fuel is expected.

(B) Cleansing Application

Recently, the UFB-containing liquids have been receiving attention as cleansing water for removing soils and the like attached to clothing. If the T-UFB generating unit described in the above embodiment is provided to a washing machine, and the UFB-containing liquid with higher purity and better permeability than the conventional liquid is supplied to the washing tub, further enhancement of detergency is expected.

With the T-UFB generating unit provided to a bath shower and a bedpan washer, not only a cleansing effect on all kinds of animals including human body but also an effect of prompting contamination removal of a water stain and a mold on a bathroom and a bedpan are expected.

With the T-UFB generating unit provided to a window washer for automobiles, a high-pressure washer for cleansing wall members and the like, a car washer, a dishwasher, a food washer, and the like, further enhancement of the cleansing effects thereof is expected.

With the T-UFB-containing liquid used for cleansing and maintenance of parts produced in a factory including a burring step after pressing, enhancement of the cleansing effect is expected.

In production of semiconductor elements, if the T-UFB-containing liquid is used as polishing water for a wafer, enhancement of the polishing effect is expected. Additionally, if the T-UFB-containing liquid is used in a resist removal step, prompting of peeling of resist that is not peeled off easily is enhanced.

With the T-UFB generating unit is provided to machines for cleansing and decontaminating medical machines such as a medical robot, a dental treatment unit, an organ preservation container, and the like, enhancement of the cleansing effect and the decontamination effect of the machines is expected. The T-UFB generating unit is also applicable to treatment of animals.

(C) Pharmaceutical Application

If the T-UFB-containing liquid is contained in cosmetics and the like, permeation into subcutaneous cells is prompted, and additives that give bad effects to skin such as preservative and surfactant can be reduced greatly. As a result, it is possible to provide safer and more functional cosmetics.

If a high concentration nanobubble preparation containing the T-UFBs is used for contrasts for medical examination apparatuses such as a CT and an MIll, reflected light of X-rays and ultrasonic waves can be efficiently used. This makes it possible to capture a more detailed image that is usable for initial diagnosis of a cancer and the like.

If a high concentration nanobubble water containing the T-UFBs is used for a ultrasonic wave treatment machine called high-intensity focused ultrasound (HIFU), the irradiation power of ultrasonic waves can be reduced, and thus the treatment can be made more non-invasive. Particularly, it is possible to reduce the damage to normal tissues.

It is possible to create a nanobubble preparation by using high concentration nanobubbles containing the T-UFBs as a source, modifying a phospholipid forming a liposome in a negative electric charge region around the air bubble, and applying various medical substances (such as DNA and RNA) through the phospholipid.

If a drug containing high concentration nanobubble water made by the T-UFB generation is transferred into a dental canal for regenerative treatment of pulp and dentine, the drug enters deeply a dentinal tubule by the permeation effect of the nanobubble water, and the decontamination effect is prompted. This makes it possible to treat the infected root canal of the pulp safely in a short time.

As described above, according to the ultrafine bubble generating method of the present invention, it is possible to efficiently generate the UFB-containing liquid with high purity by providing the pre-processing unit and the dissolving unit before the T-UFB generating unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-035776 filed Feb. 28, 2019, and No. 2020-019019 filed Feb. 6, 2020 which are hereby incorporated by reference wherein in their entirety.

What is claimed is:

1. An ultrafine bubble generating method comprising:
a generating step of generating ultrafine bubbles with a diameter of less than 1.0 μm by causing a heating element provided in a liquid to generate heat to generate film boiling on an interface between the liquid and the heating element; and
a post-processing step of performing predetermined post-processing on an ultrafine bubble-containing liquid containing the ultrafine bubbles generated in the generating step, the post-processing step comprising removal processing for removing an impurity from the ultrafine bubble-containing liquid,
wherein the removal processing includes a first processing for removing an inorganic ion by using a cation exchange resin, the inorganic ion containing a metal forming the heating element.

2. The ultrafine bubble generating method according to claim 1, wherein the removal processing includes a third processing for removing an insoluble solid substance by using precipitation characteristics of the insoluble solid substance.

3. The ultrafine bubble generating method according to claim 1, further comprising:
a dissolving step of dissolving any one of hydrogen, helium, oxygen, nitrogen, methane, fluorine, neon, carbon dioxide, ozone, argon, chlorine, ethane, propane, air, and a mixed gas containing these into the liquid to be supplied in the generating step,
wherein in the generating step, ultrafine bubbles containing inside thereof gas that is dissolved in the dissolving step are generated.

4. The ultrafine bubble generating method according to claim 1, wherein the generating step is performed again after the post-processing step is performed.

5. The ultrafine bubble generating method according to claim 1, further comprising:
a step of collecting the ultrafine bubble-containing liquid processed in the post-processing step.

6. An ultrafine bubble generating apparatus comprising:
a generating unit that generates ultrafine bubbles with a diameter of less than 1.0 μm by causing a heating element provided in a liquid to generate heat to generate film boiling on an interface between the liquid and the heating element; and
a post-processing unit that performs predetermined post-processing on an ultrafine bubble-containing liquid containing the ultrafine bubbles generated by the generating unit, the post-processing unit comprising an increasing processing unit that increases a concentration of the ultrafine bubbles contained in the ultrafine bubble-containing liquid by generating ultrasound in the ultrafine bubble-containing liquid.

7. The ultrafine bubble generating apparatus according to claim 6, wherein the post-processing unit includes a removal unit that removes an impurity from the ultrafine bubble-containing liquid.

8. The ultrafine bubble generating apparatus according to claim 7, wherein the removal unit includes a first unit that removes an inorganic ion by using a cation exchange resin.

9. The ultrafine bubble generating apparatus according to claim 8, wherein the inorganic ion contains a metal forming the heating element.

10. The ultrafine bubble generating apparatus according to claim 9, wherein the inorganic ion removed by the first unit contains at least one selected from the group consisting of Si, AL, W, Pt, Pd, Ta, Fe, Cr, Ni, Ir, and Ru.

11. The ultrafine bubble generating apparatus according to claim 7, wherein the removal unit includes a second unit that removes an organic substance by using a filtration filter.

12. The ultrafine bubble generating apparatus according to claim 11, wherein the organic substance to be removed by the second unit contains at least one selected from the group consisting of an organic compound containing silicon, siloxane, epoxy, and bacteria.

13. The ultrafine bubble generating apparatus according to claim 11, wherein the filtration filter has a mesh diameter of 1 μm or smaller.

14. The ultrafine bubble generating apparatus according to claim 7, wherein the removal unit includes a third unit that removes an insoluble solid substance by using precipitation characteristics of the insoluble solid sub stance.

15. The ultrafine bubble generating apparatus according to claim 6, further comprising:
a dissolving unit that dissolves any one of hydrogen, helium, oxygen, nitrogen, methane, fluorine, neon, carbon dioxide, ozone, argon, chlorine, ethane, propane, air, and a mixed gas containing these into the liquid to be supplied to the generating unit,
wherein the generating unit generates ultrafine bubbles containing inside thereof gas that is dissolved by the dissolving unit.

16. The ultrafine bubble generating apparatus according to claim 6, further comprising:
a circulation route through which the ultrafine bubble-containing liquid processed by the post-processing unit is supplied to the generating unit.

17. The ultrafine bubble generating apparatus according to claim 6, further comprising:
a unit that collects the ultrafine bubble-containing liquid processed by the post-processing unit.

18. An ultrafine bubble-containing liquid that contains ultrafine bubbles with a diameter of less than 1.0 μm generated by an ultrafine bubble generating method including:
a generating step of generating the ultrafine bubbles by causing a heating element provided in a liquid to generate heat to generate film boiling on an interface between the liquid and the heating element; and
a post-processing step of performing predetermined post-processing on an ultrafine bubble-containing liquid containing the ultrafine bubbles generated in the generating step, the post-processing step comprising removal processing for removing an impurity from the ultrafine bubble-containing liquid,
wherein the removal processing includes first processing for removing an inorganic ion by using a cation exchange resin, the inorganic ion containing a metal forming the heating element.

19. An ultrafine bubble generating method comprising:
a generating step of generating ultrafine bubbles with a diameter of less than 1.0 μm by causing a heating element provided in a liquid to generate heat to generate film boiling on an interface between the liquid and the heating element; and
a post-processing step of performing predetermined post-processing on an ultrafine bubble-containing liquid containing the ultrafine bubbles generated in the generating step, the post-processing step comprising removal processing for removing an impurity from the ultrafine bubble-containing liquid,
wherein the removal processing includes first processing for removing an inorganic ion by using a cation exchange resin, the inorganic ion containing at least one selected from the group consisting of Si, AL, W, Pt, Pd, Ta, Fe, Cr, Ni, Ir, and Ru.

20. The ultrafine bubble generating method according to claim 19, wherein the removal processing includes third processing for removing an insoluble solid substance by using precipitation characteristics of the insoluble solid substance.

21. The ultrafine bubble generating method according to claim 19, further comprising:
a dissolving step of dissolving any one of hydrogen, helium, oxygen, nitrogen, methane, fluorine, neon, carbon dioxide, ozone, argon, chlorine, ethane, propane, air, and a mixed gas containing these into the liquid to be supplied in the generating step,
wherein in the generating step, ultrafine bubbles containing inside thereof gas that is dissolved in the dissolving step are generated.

22. The ultrafine bubble generating method according to claim 19, wherein the generating step is performed again after the post-processing step is performed.

23. The ultrafine bubble generating method according to claim 19, further comprising:
a step of collecting the ultrafine bubble-containing liquid processed in the post-processing step.

24. An ultrafine bubble generating method comprising:
a generating step of generating ultrafine bubbles with a diameter of less than 1.0 μm by causing a heating element provided in a liquid to generate heat to generate film boiling on an interface between the liquid and the heating element; and
a post-processing step of performing predetermined post-processing on an ultrafine bubble-containing liquid containing the ultrafine bubbles generated in the generating step, the post-processing step comprising removal processing for removing an impurity from the ultrafine bubble-containing liquid,
wherein the removal processing includes second processing for removing an organic substance by using a filtration filter, the organic substance containing at least one selected from the group consisting of an organic compound containing silicon, siloxane, epoxy, and bacteria.

25. The ultrafine bubble generating method according to claim 24, wherein the removal processing includes third processing for removing an insoluble solid substance by using precipitation characteristics of the insoluble solid substance.

26. The ultrafine bubble generating method according to claim 24, further comprising:
a dissolving step of dissolving any one of hydrogen, helium, oxygen, nitrogen, methane, fluorine, neon, carbon dioxide, ozone, argon, chlorine, ethane, propane, air, and a mixed gas containing these into the liquid to be supplied in the generating step,
wherein in the generating step, ultrafine bubbles containing inside thereof gas that is dissolved in the dissolving step are generated.

27. The ultrafine bubble generating method according to claim 24, wherein the generating step is performed again after the post-processing step is performed.

28. The ultrafine bubble generating method according to claim 24, further comprising:
a step of collecting the ultrafine bubble-containing liquid processed in the post-processing step.

29. An ultrafine bubble generating method comprising:
a generating step of generating ultrafine bubbles with a diameter of less than 1.0 μm by causing a heating element provided in a liquid to generate heat to generate film boiling on an interface between the liquid and the heating element; and
a post-processing step of performing predetermined post-processing on an ultrafine bubble-containing liquid containing the ultrafine bubbles generated in the generating step, the post-processing step comprising increasing processing for increasing a concentration of the ultrafine bubbles contained in the ultrafine bubble-containing liquid by generating ultrasound in the ultrafine bubble-containing liquid.

30. An ultrafine bubble generating method comprising:
a generating step of generating ultrafine bubbles with a diameter of less than 1.0 μm by causing a heating element provided in a liquid to generate heat to generate film boiling on an interface between the liquid and the heating element; and a post-processing step of performing predetermined post-processing on an ultrafine bubble-containing liquid containing the ultrafine bubbles generated in the generating step, the post-processing step comprising increasing processing for increasing a concentration of the ultrafine bubbles contained in the ultrafine bubble-containing liquid by applying focused ultrasound to the ultrafine bubble-containing liquid.

31. An ultrafine bubble generating apparatus comprising:
a generating unit that generates ultrafine bubbles with a diameter of less than 1.0 µm by causing a heating element provided in a liquid to generate heat to generate film boiling on an interface between the liquid and the heating element; and
a post-processing unit that performs predetermined post-processing on an ultrafine bubble-containing liquid containing the ultrafine bubbles generated by the generating unit, the post-processing unit comprising an increasing processing unit that increases a concentration of the ultrafine bubbles contained in the ultrafine bubble-containing liquid by applying focused ultrasound to the ultrafine bubble-containing liquid.

32. The ultrafine bubble generating apparatus according to claim 31, wherein the post-processing unit includes a removal unit that removes an impurity from the ultrafine bubble-containing liquid.

33. The ultrafine bubble generating apparatus according to claim 32, wherein the removal unit includes a first unit that removes an inorganic ion by using a cation exchange resin.

34. The ultrafine bubble generating apparatus according to claim 33, wherein the inorganic ion contains a metal forming the heating element.

35. The ultrafine bubble generating apparatus according to claim 34, wherein the inorganic ion contains at least one selected from the group consisting of Si, AL, W, Pt, Pd, Ta, Fe, Cr, Ni, Ir, and Ru.

36. The ultrafine bubble generating apparatus according to claim 32, wherein the removal unit includes a second unit that removes an organic substance by using a filtration filter.

37. The ultrafine bubble generating apparatus according to claim 36, wherein the organic substance contains at least one selected from the group consisting of an organic compound containing silicon, siloxane, epoxy, and bacteria.

38. The ultrafine bubble generating apparatus according to claim 36, wherein the filtration filter has a mesh diameter of 1 µm or smaller.

39. The ultrafine bubble generating apparatus according to claim 32, wherein the removal unit includes a third unit that removes an insoluble solid substance by using precipitation characteristics of the insoluble solid substance.

40. The ultrafine bubble generating apparatus according to claim 31, further comprising:
a dissolving unit that dissolves any one of hydrogen, helium, oxygen, nitrogen, methane, fluorine, neon, carbon dioxide, ozone, argon, chlorine, ethane, propane, air, and a mixed gas containing these into the liquid to be supplied to the generating unit,
wherein the generating unit generates ultrafine bubbles containing inside thereof gas that is dissolved by the dissolving unit.

41. The ultrafine bubble generating apparatus according to claim 31, further comprising:
a circulation route through which the ultrafine bubble-containing liquid processed by the post-processing unit is supplied to the generating unit.

42. The ultrafine bubble generating apparatus according to claim 31, further comprising:
a unit that collects the ultrafine bubble-containing liquid processed by the post-processing unit.

43. An ultrafine bubble-containing liquid that contains ultrafine bubbles with a diameter of less than 1.0 µm generated by an ultrafine bubble generating method including:
a generating step of generating the ultrafine bubbles by causing a heating element provided in a liquid to generate heat to generate film boiling on an interface between the liquid and the heating element; and
a post-processing step of performing predetermined post-processing on an ultrafine bubble-containing liquid containing the ultrafine bubbles generated in the generating step, the post-processing step comprising removal processing for removing an impurity from the ultrafine bubble-containing liquid,
wherein the removal processing includes first processing for removing an inorganic ion by using a cation exchange resin, the inorganic ion containing at least one selected from the group consisting of Si, AL, W, Pt, Pd, Ta, Fe, Cr, Ni, Ir, and Ru.

44. An ultrafine bubble-containing liquid that contains ultrafine bubbles with a diameter of less than 1.0 µm generated by an ultrafine bubble generating method including:
a generating step of generating the ultrafine bubbles by causing a heating element provided in a liquid to generate heat to generate film boiling on an interface between the liquid and the heating element; and
a post-processing step of performing predetermined post-processing on an ultrafine bubble-containing liquid containing the ultrafine bubbles generated in the generating step, the post-processing step comprising removal processing for removing an impurity from the ultrafine bubble-containing liquid,
wherein the removal processing includes second processing for removing an organic substance by using a filtration filter, the organic substance containing at least one selected from an organic compound containing silicon, siloxane, epoxy, and bacteria.

* * * * *